US012224458B2

(12) United States Patent
Yamamoto

(10) Patent No.: US 12,224,458 B2
(45) Date of Patent: Feb. 11, 2025

(54) BATTERY, BATTERY PACK, AND VEHICLE

(71) Applicants: Kabushiki Kaisha Toshiba, Tokyo (JP); Toshiba Infrastructure Systems & Solutions Corporation, Kawasaki (JP)

(72) Inventor: Kuniaki Yamamoto, Kanagawa (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 470 days.

(21) Appl. No.: 17/679,840

(22) Filed: Feb. 24, 2022

(65) Prior Publication Data

US 2022/0255200 A1   Aug. 11, 2022

Related U.S. Application Data

(63) Continuation of application No. PCT/JP2019/036209, filed on Sep. 13, 2019.

(51) Int. Cl.
  *H01M 50/538*   (2021.01)
  *H01M 50/147*   (2021.01)
  *H01M 50/586*   (2021.01)

(52) U.S. Cl.
  CPC ....... *H01M 50/538* (2021.01); *H01M 50/147* (2021.01); *H01M 50/586* (2021.01); *H01M 2220/20* (2013.01)

(58) Field of Classification Search
  CPC ............. H01M 50/538; H01M 50/147; H01M 50/586; H01M 2220/20; H01M 50/209;
  (Continued)

(56) References Cited

U.S. PATENT DOCUMENTS 10,074,831 B2  9/2018 Tsuruta et al.
2006/0024568 A1  2/2006 Lee
    (Continued)

FOREIGN PATENT DOCUMENTS

CN    107256801 A    10/2017
JP    2001-135299 A   5/2001
    (Continued)

OTHER PUBLICATIONS

Office Action issued on Jan. 5, 2023, in corresponding Chinese Application No. 201980095937.2, 16 pages.

*Primary Examiner* — Muhammad S Siddiquee
(74) *Attorney, Agent, or Firm* — Maier & Maier, PLLC

(57) ABSTRACT

A battery includes: an outer container; an electrode assembly; a lid member; a current collection tab; an electrode terminal; a lead; an insulation guard; and a pair of protrusions. The outer container includes a bottom wall and a peripheral wall, and the peripheral wall includes a pair of side walls opposed to each other across the internal cavity in a longitudinal direction. The current collection tab protrudes from the electrode assembly in a lateral direction in the internal cavity, and the insulation guard electrically insulates the lead and the current collection tab from an inner surface of the outer container in the internal cavity. Each of the pair of protrusions protrudes from the insulation guard and abuts on a boundary portion between corresponding one of the pair of side walls and the bottom wall.

20 Claims, 9 Drawing Sheets

(58) Field of Classification Search
CPC .............. H01M 50/103; H01M 50/59; H01M 10/0431; H01M 50/531; H01M 10/058; H01M 10/0587; Y02E 60/10; Y02P 70/50
See application file for complete search history.

(56) References Cited

U.S. PATENT DOCUMENTS

| | | |
|---|---|---|
| 2006/0024578 A1 | 2/2006 | Lee |
| 2010/0209750 A1* | 8/2010 | Nagamatsu .......... H01M 50/119 |
| | | 429/94 |
| 2013/0084488 A1* | 4/2013 | Waki .................. H01M 50/533 |
| | | 429/186 |
| 2013/0209859 A1 | 8/2013 | Tsuruta et al. |
| 2014/0087223 A1* | 3/2014 | Hamakawa ....... H01M 10/0413 |
| | | 429/94 |
| 2014/0170463 A1 | 6/2014 | Kanemoto et al. |
| 2015/0380691 A1 | 12/2015 | Tsuruta et al. |

FOREIGN PATENT DOCUMENTS

| | | |
|---|---|---|
| JP | 2006-40901 A | 2/2006 |
| JP | 4296522 B2 | 4/2009 |
| JP | 4484782 B2 | 4/2010 |
| JP | 2013-191544 A | 9/2013 |
| JP | 2014-067622 A | 4/2014 |
| JP | 2014-120426 A | 6/2014 |
| JP | 2015-103277 A | 6/2015 |
| WO | WO 2013-061460 A1 | 5/2013 |
| WO | WO 2014-054355 A1 | 4/2014 |

\* cited by examiner

BATTERY, BATTERY PACK, AND VEHICLE

CROSS-REFERENCE TO RELATED APPLICATION(S)

This application is based upon and claims the benefit of priority from No. PCT/JP2019/36209, filed Sep. 13, 2019, the entire contents of which are incorporated herein by reference.

FIELD

Embodiments described herein relate generally to a battery, a battery pack, and a vehicle.

BACKGROUND

With the progress of electronic apparatuses such as a cellular telephone and a personal computer, batteries such as secondary batteries used in these electronic apparatuses are required to achieve miniaturization and weight reduction. Examples of secondary batteries for which miniaturization and weight reduction are implemented and which are high in energy density include a lithium-ion secondary battery. Meanwhile, secondary batteries such as a lead storage battery and a nickel-hydrogen battery are used as large-sized and large-capacity power supplies mounted in vehicles such as an electric vehicle, a hybrid vehicle, an electric motorcycle, and a forklift. Furthermore, in recent years, the development of a lithium-ion secondary battery high in energy density is underway to be adopted as a large-sized and large-capacity power supply mounted in a vehicle. In developing the lithium-ion secondary battery to be mounted in a vehicle, it is required to achieve a longer life of the battery, improve safety, and the like and, at the same time, to increase the size and capacity of the battery.

Some batteries such as a lithium-ion secondary battery include an electrode assembly including a positive electrode and a negative electrode and accommodated in an internal cavity of an outer container. In such a battery, the outer container includes a bottom wall and a peripheral wall, and the internal cavity of the outer container includes an opening to an opposite side to the bottom wall in a height direction. In addition, a lid member is attached to the peripheral wall of the outer container and the lid member blocks the opening of the internal cavity. Moreover, electrode terminals are attached to an outer surface of the lid member, and current collection tabs protrude from the electrode assembly toward an outer peripheral side in the internal cavity. The current collection tabs are then electrically connected to the electrode terminals via leads. Furthermore, insulation guards formed from a material having electrical insulating properties are disposed in the internal cavity, and the insulation guards prevent contact of the leads and the current collection tabs with an inner surface of the outer container. The leads and the current collection tabs are thereby electrically insulated from the outer container.

In the battery described above, built-in structures such as the electrode assembly accommodated in the internal cavity are constrained by the peripheral wall and the like of the outer container. Due to this, even with the occurrence of an external shock such as a vibration caused by traveling of the vehicle mounting the battery, an influence of the external shock on the built-in structures including the electrode assembly, the current collection tabs, the leads, and the insulation guards is reduced.

In this case, with the use of the battery described above, a gas is often produced from the electrode assembly in the internal cavity. As a result of producing the gas in the internal cavity, the outer container expands. In the battery, it is required for the peripheral wall and the like of the outer container to appropriately constrain the built-in structures even with the producing of the gas in the internal cavity. It is also required to ensure insertability of the built-in structures into the internal cavity of the outer container at a time of manufacturing the battery.

Examples of related art include JP-A-2006-40901.

DETAILED DESCRIPTION

Embodiments provide a battery that can appropriately constrain built-in structures in an internal cavity even when an outer container expands and that can ensure insertability of the built-in structures into the internal cavity at a time of manufacturing, as well as a battery pack and a vehicle each including the battery.

In general, according to one embodiment, a battery includes: an outer container; an electrode assembly; a lid member; a current collection tab; an electrode terminal; a lead; an insulation guard; a first protrusion; and a second protrusion.

The outer container includes a bottom wall and a peripheral wall. In the outer container, an internal cavity constructed by the bottom wall and the peripheral wall includes an opening to an opposite side to the bottom wall in a height direction. The peripheral wall includes a first side wall and a second side wall opposed to each other across the internal cavity in a longitudinal direction crossing the height direction.

The electrode assembly includes a positive electrode and a negative electrode and is accommodated in the internal cavity of the outer container. The lid member is attached to the peripheral wall in an end portion on the opposite side to the bottom wall and blocks the opening of the internal cavity. The current collection tab protrudes from the electrode assembly in a lateral direction crossing both the longitudinal direction and the height direction in the internal cavity. The electrode terminals are attached to an outer surface of the lid member. The lead is disposed in the internal cavity and electrically connects the current collection tab to the electrode terminal. The insulation guard is formed from a material having electrical insulating properties, and electrically insulates the lead and the current collection tab from an inner surface of the outer container in the internal cavity.

Each of the first protrusion and the second protrusion is connected to the insulation guard and protrudes from the insulation guard. A protruding end of the first protrusion abuts on a boundary portion between the first side wall and the bottom wall, and a protruding end of the second protrusion abuts on a boundary portion between the second side wall and the bottom wall.

According to the embodiments, a battery pack including one or more batteries described above is provided.

According to the embodiments, a vehicle including the battery pack described above is provided.

[Battery]

First, a battery according to a first embodiment will be described.

Figure 1:
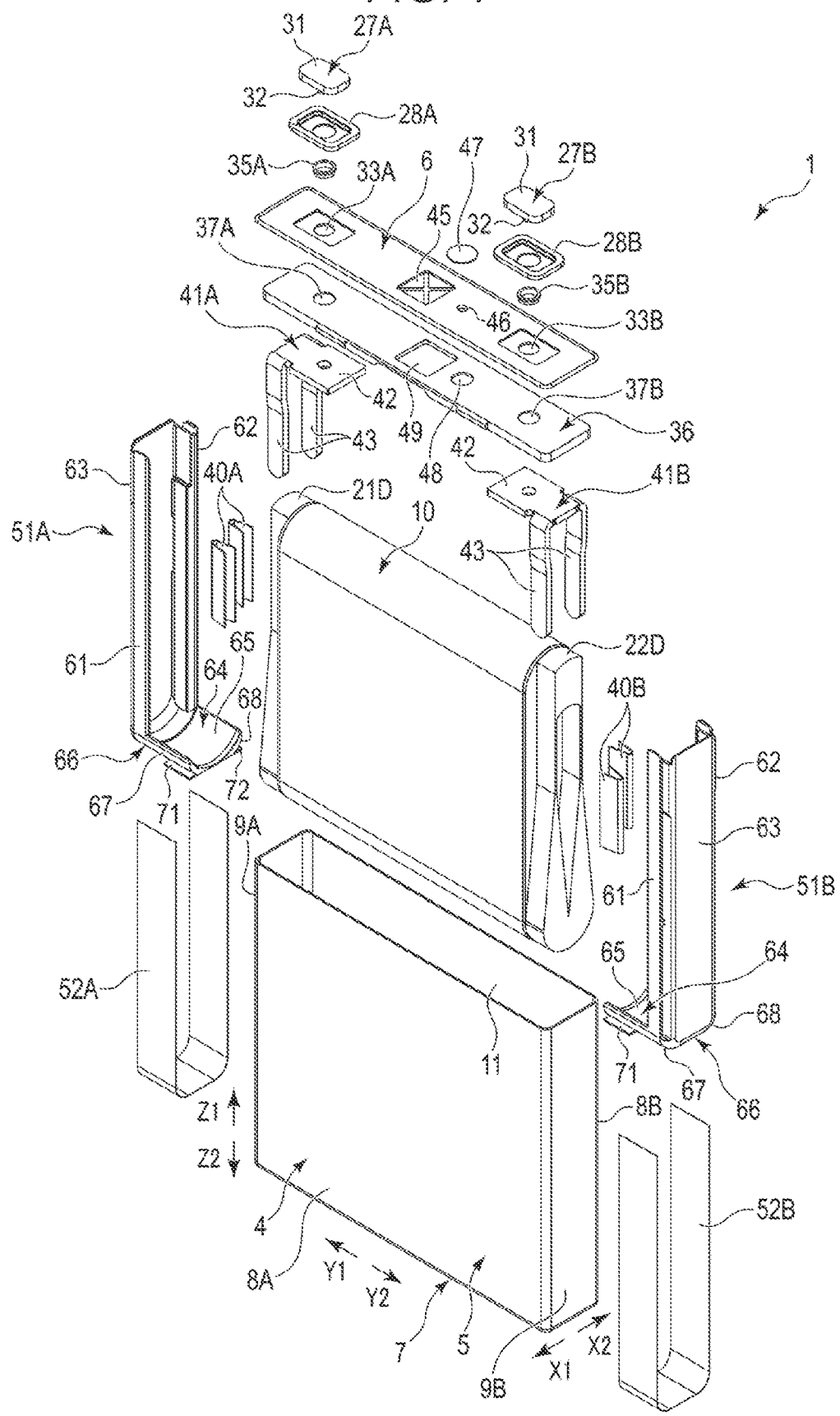
FIG. 1 is a perspective view schematically showing a battery in a state of breaking down elements of the battery according to a first embodiment.
Figure 2:
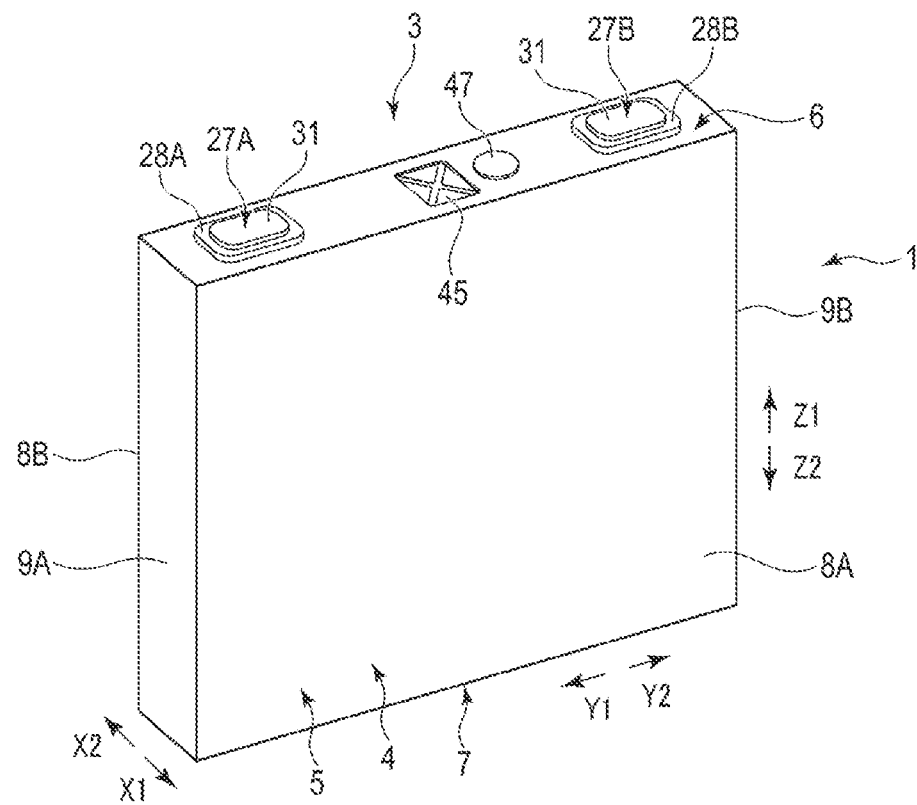
FIG. 2 is a perspective view schematically showing the battery in an assembled state according to the first embodiment.

First, as an example of the battery according to an embodiment, a battery 1 according to a first embodiment will be illustrated. FIGS. 1 and 2 show an example of the battery 1 according to the first embodiment. FIG. 1 shows herein the battery 1 with members broken down apiece, while FIG. 2 shows the battery 1 in an assembled state. The battery 1 is, for example, a secondary battery.

As shown in FIGS. 1 and 2, the battery 1 includes an outer portion 3. The outer portion 3 is formed from a metal such as aluminum, an aluminum alloy, iron, or stainless steel. In addition, an internal cavity 11 is formed within the outer portion 3. For the battery 1 and the outer portion 3, a longitudinal direction (direction indicated by arrows X1 and X2), a lateral direction, which is a direction indicated by arrows Y1 and Y2, crossing (perpendicular to or substantially perpendicular to) the longitudinal direction, and a height direction, which is a direction indicated by arrows Z1 and Z2, crossing (perpendicular to or substantially perpendicular to) both the lateral direction and the longitudinal direction are defined.

The outer portion 3 includes an outer container 5 and a lid member 6. In the present embodiment, the outer container 5 includes a bottom wall 7 and a peripheral wall 4, and the bottom wall 7 and the peripheral wall 4 construct the internal cavity 11. The bottom wall 7 is located on one side (arrow Z2-side) in the height direction with respect to the internal cavity 11. Furthermore, the peripheral wall 4 extends along a peripheral direction of the outer container 5 and the peripheral wall 4 surrounds an outer peripheral side of the internal cavity 11. Moreover, the internal cavity 11 includes an opening to an opposite side (arrow Z1-side) to the side on which the bottom wall 7 is located in the height direction. Due to this, in the example of FIGS. 1, 2, and the like, the outer container 5 is formed into a substantially rectangular parallelepiped including one opening surface. In the battery 1 and the outer portion 3, herein, a direction along an opening edge of the internal cavity 11 coincides or substantially coincides with the peripheral direction. In addition, a side on which the internal cavity 11 (internal space) is located with respect to the peripheral wall 4 is an inner peripheral side and an opposite side to the inner peripheral side is an outer peripheral side.

The peripheral wall 4 includes two pairs of side walls 8A, 8B, 9A, and 9B. A pair of side walls 8A and 8B are opposed to each other across the internal cavity 11 in the longitudinal direction. In addition, a pair of side walls 9A and 9B are opposed to each other across the internal cavity 11 in the lateral direction. The side walls 8A and 8B extend continuously along the lateral direction between the side walls 9A and 9B. In addition, the side walls 9A and 9B extend continuously along the longitudinal direction between the side walls 8A and 8B. Because of the configurations described above, a first side wall that is one of the side walls 8A and 8B is adjacent to the internal cavity 11 from one side in the longitudinal direction, and a second side wall that is the other side wall 8A or 8B is adjacent to the internal cavity 11 from an opposite side to the first side wall in the longitudinal direction. In addition, a third side wall that is one of the side walls 9A and 9B is adjacent to the internal cavity 11 from one side in the lateral direction, and a fourth side wall that is the other side wall 9A or 9B is adjacent to the internal cavity 11 from an opposite side to the third side wall in the lateral direction.

The lid member 6 is attached to the outer container 5 in the opening of the internal cavity 11. That is, the lid member 6 is attached to the peripheral wall 4 in an end portion on an opposite side to the bottom wall 7. The lid member 6 blocks the opening of the internal cavity 11. In the present embodiment, the lid member 6 is provided in a state in which a thickness direction of the lid member 6 coincides or substantially coincides with the height direction of the battery 1.

In the present embodiment, a distance between the pair of side walls 8A and 8B in the longitudinal direction is far smaller than a distance between the bottom wall 7 and the lid member 6 in the height direction and a distance between the pair of side walls 9A and 9B in the lateral direction. Due to this, in the internal cavity 11, a size in the longitudinal direction is far smaller than a size in the lateral direction and a size in the height direction. Due to this, in the outer container 5, the side walls 8A and 8B serve as longer side walls and the side walls 9A and 9B serve as shorter side walls. Furthermore, the outer portion 3 (the outer container 5 and the lid member 6) is formed at an identical or substantially identical thickness over an entirety of the outer portion 3. Therefore, a size of the battery 1 in the longitudinal direction is far smaller than a size thereof in the lateral direction and a size thereof in the height direction. It is noted that the outer portion 3 may be formed at a smaller thickness, e.g., equal to or greater than 0.02 mm and equal to or smaller than 0.3 mm.

Figure 3:
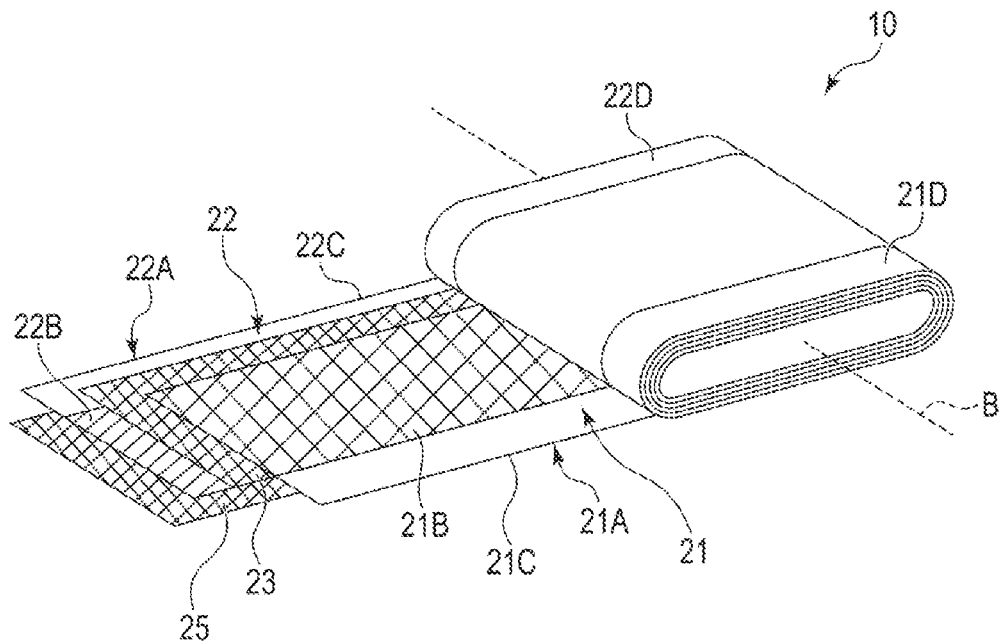
FIG. 3 is a schematic diagram showing an example of configurations of an electrode assembly in the battery according to the first embodiment.

The internal cavity 11 of the outer portion 3 accommodates therein an electrode assembly 10. FIG. 3 is an explanatory diagram of configurations of the electrode assembly 10. As shown in FIG. 3, the electrode assembly 10 is formed into, for example, a flattened shape and includes, for example, a positive electrode 21, a negative electrode 22, and separators 23 and 25. The positive electrode 21 includes a positive-electrode current collection foil 21A that serves as a positive-electrode current collection body, and a positive-electrode active material-containing layer 21B supported on a front surface of the positive-electrode current collection foil 21A. The positive-electrode current collection foil 21A is an aluminum foil, an aluminum alloy foil, or the like, and has a thickness of approximately 10 μm to 20 μm. Slurry containing a positive-electrode active material, a binder, and a conductive agent is coated onto the positive-electrode current collection foil 21A. Examples of the positive-electrode active material include an oxide, a sulfide, and a polymer capable of occluding and discharging lithium, however, the examples are not limited thereto. Furthermore, from the viewpoint of obtaining a high positive electrode potential, it is preferable to use, as the positive-electrode active material, a lithium manganese composite oxide, a lithium nickel composite oxide, a lithium cobalt composite oxide, a lithium iron phosphate, or the like.

The negative electrode 22 includes a negative-electrode current collection foil 22A that serves as a negative-electrode current collection body, and a negative-electrode active material-containing layer 22B supported on a front surface of the negative-electrode current collection foil 22A. The negative-electrode current collection foil 22A is an aluminum foil, an aluminum alloy foil, a copper foil, or the like and has a thickness of approximately 10 μm to 20 μm. Slurry containing a negative-electrode active material, a binder, and a conductive agent is coated onto the negative-electrode current collection foil 22A. Examples of the negative-electrode active material include a metal oxide, a metal sulfide, a metal nitride, and a carbon material capable of occluding and discharging lithium ions; however, the examples are not limited thereto. It is preferable to adopt, as the negative-electrode active material, a material at a lithium-ion occlusion/discharge potential equal to or higher than 0.4 V (vs.Li+/Li) than a lithium-metal potential, i.e., at the lithium-ion occlusion/discharge potential equal to or higher than 0.4 V (vs.Li+/Li). Using the negative-electrode active material at such a lithium-ion occlusion/discharge potential enables suppression of an alloy reaction between either aluminum or the aluminum alloy and lithium; thus, it is possible to use aluminum and the aluminum alloy for elements associated with the negative-electrode current collection foil 22A and the negative electrode 22. Examples of the negative-electrode active material at the lithium-ion occlusion/discharge potential equal to or higher than 0.4 V (vs.Li+/Li) include a lithium titanium composite oxide such as a titanium oxide and a lithium titanate, a tungsten oxide, an amorphous tin oxide, a niobium titanium composite oxide, a tin silicon oxide, and a silicon oxide. It is particularly preferable to use the lithium titanium composite oxide as the negative-electrode active material. A copper foil may be used as the negative-electrode current collection foil 22A when using a carbon material occluding and discharging lithium ions as the negative-electrode active material. The carbon material used as the negative-electrode active material has a lithium-ion occlusion/discharge potential of approximately 0 V (vs.Li+/Li).

The aluminum alloy used for the positive-electrode current collection foil 21A and the negative-electrode current collection foil 22A desirably contains either one element or two or more elements selected from among a group consisting of Mg, Ti, Zn, Mn, Fe, Cu, and Si. Purity of aluminum and the aluminum alloy can be set to equal to or higher than 98 percent by weight and preferably equal to or higher than 99.99 percent by weight. Furthermore, pure aluminum at purity of 100% can be used as the positive-electrode current collection body and/or the negative-electrode current collection body. A content of a transition metal such as nickel or chromium in aluminum and the aluminum alloy is preferably equal to or lower than 100 ppm by weight (including zero ppm by weight).

In the positive-electrode current collection foil 21A, one long side edge 21C and neighboring regions of the long side edge 21C form a positive-electrode current collection tab 21D. In the example of FIG. 3, the positive-electrode current collection tab 21D is formed over an entire length of the long side edge 21C. In the positive-electrode current collection tab 21D, the positive-electrode active material-containing layer 21B is not supported on the front surface of the positive-electrode current collection foil 21A. Therefore, the positive-electrode current collection foil 21A has the positive-electrode current collection tab 21D as a part on which the positive-electrode active material-containing layer 21B is not supported. Furthermore, in the negative-electrode current collection foil 22A, one long side edge 22C and neighboring regions of the long side edge 22C form a negative-electrode current collection tab 22D. In the example of FIG. 3, the negative-electrode current collection tab 22D is formed over an entire length of the long side edge 22C. In the negative-electrode current collection tab 22D, the negative-electrode active material-containing layer 22B is not supported on the front surface of the negative-electrode current collection foil 22A. Therefore, the negative-electrode current collection foil 22A has the negative-electrode current collection tab 22D as a part on which the negative-electrode active material-containing layer 22B is not supported.

Each of the separators 23 and 25 is formed from a material having electrical insulating properties and electrically insulates the positive electrode 21 from the negative electrode 22. Each of the separators 23 and 25 may be a sheet or the like separate from the positive electrode 21 and the negative electrode 22 or may be integrally formed with one of the positive electrode 21 and the negative electrode 22. Furthermore, the separators 23 and 25 may be formed from an organic material, formed from an inorganic material, or formed from a mixture of the organic material and the inorganic material. Examples of the organic material forming the separators 23 and 25 include engineering plastic and super engineering plastic. In addition, examples of engineering plastic include polyamide, polyacetal, polybutylene terephthalate, polyethylene terephthalate, syndiotactic polystyrene, polycarbonate, polyamide-imide, polyvinyl alcohol, polyvinylidene fluoride, and modified-Polyphenyleneether. Furthermore, examples of super engineering plastic include polyphenylene sulfide, polyether ether ketone, liquid crystal polymer, polyvinylidene fluoride, polytetrafluoroethylene (PTFE), polyether nitrile, polysulfone, polyacrylate, polyetherimide, and thermoplastic polyimide. Moreover, examples of the inorganic material forming the separators 23 and 25 include oxides such as an aluminum oxide, a silicon dioxide, a magnesium oxide, a phosphorus oxide, a calcium oxide, an iron oxide, and a titanium oxide and nitrides such as a boron nitride, an aluminum nitride, a silicon nitride, and a barium nitride.

In the electrode assembly 10, the positive electrode 21, the negative electrode 22, and the separators 23 and 25 are wound about a winding axis B into a flattened shape in a state in which the separators 23 and 25 are put between the positive-electrode active material-containing layer 21B and the negative-electrode active material-containing layer 22B. The positive electrode 21, the separator 23, the negative electrode 22, and the separator 25 are wound in a state, for example, of being superimposed in this order. Furthermore, in the electrode assembly 10, the positive-electrode current collection tab 21D of the positive-electrode current collection foil 21A protrudes to one side in a direction along the winding axis B with respect to the negative electrode 22 and the separators 23 and 25. In addition, the negative-electrode current collection tab 22D of the negative-electrode current collection foil 22A protrudes to an opposite side to the side to which the positive-electrode current collection tab 21D protrudes in the direction along the winding axis B with respect to the positive electrode 21 and the separators 23 and 25.

The electrode assembly 10 is disposed in a state in which the winding axis B is in parallel to or substantially in parallel to the lateral direction of the battery 1. Due to this, in the internal cavity 11 of the outer portion 3, the positive-electrode current collection tab 21D protrudes to one side in the lateral direction with respect to the negative electrode 22 and the separators 23 and 25. In addition, the negative-electrode current collection tab 22D protrudes to the opposite side to the side to which the positive-electrode current collection tab 21D protrudes in the lateral direction with respect to the positive electrode 21 and the separators 23 and 25. Each of the current collection tabs 21D and 22D, therefore, protrudes to an outer peripheral side from the electrode assembly 10 in the internal cavity 11. In the example of FIGS. 1, 2, and the like, the positive-electrode current collection tab 21D protrudes to a side on which the side wall 9A is located from the electrode assembly 10. In addition, the negative-electrode current collection tab 22D protrudes to a side on which the side wall 9B is located from the electrode assembly 10.

Exposed parts except from the current collection tabs 21D and 22D from the internal cavity 11 in the electrode assembly 10 are formed from a material having electrical insulating properties. The exposed parts except from the current collection tabs 21D and 22D from the internal cavity 11 in the electrode assembly 10 are formed from, for example, either the separator 23 or 25 or an insulating sheet separate from the separators 23 and 25.

Furthermore, the electrode assembly 10 does not need to have a winding structure of winding the positive electrode 21, the negative electrode 22, and the separators 23 and 25. In embodiments, the electrode assembly 10 may have a stacked structure of alternately stacking a plurality of positive electrodes and a plurality of negative electrodes, and separators are provided between the positive electrodes and the negative electrodes. In this case, the positive-electrode current collection tab similarly protrudes to one side in the lateral direction of the battery 1 (outer portion 3) with respect to the negative electrodes in the electrode assembly 10. In addition, the negative-electrode current collection tab protrudes to the opposite side to the side to which the positive-electrode current collection tab protrudes in the lateral direction of the battery 1 with respect to the positive electrodes in the electrode assembly. Each of the current collection tabs, therefore, protrudes to the outer peripheral side from the electrode assembly 10 in the internal cavity 11.

In embodiments, the electrode assembly 10 may be impregnated with an electrolytic solution, not shown, in the internal cavity 11. A non-aqueous electrolytic solution, e.g., non-aqueous electrolytic solution prepared by dissolving an electrolyte in an organic solvent is used as the electrolytic solution. In this case, examples of the electrolyte dissolved in the organic solvent include lithium salts including lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate (($LiCF_3SO_3$), and lithium bis(trifluoromethylsulfonyl)imide [$LiN(CF_3SO_2)_2$], and mixtures thereof. Furthermore, examples of the organic solvent include cyclic carbonate such as propylene carbonate (PC), ethylene carbonate (EC) and vinylene carbonate, chain carbonate such as diethyl carbonate (DEC), dimethyl carbonate (DMC), and methyl ethyl carbonate (MEC), cyclic ether such as tetrahydrofuran (THF), 2-methyltetrahydrofuran (2MeTHF), and dioxolane (DOX), chain ether such as dimethoxyethane (DME) and diethoxyethane (DEE), gamma-butyrolactone (GBL), acetonitrile (AN), and sulfolane (SL). These organic solvents are used solely or used as a mixed solvent.

Moreover, in embodiments, a gel non-aqueous electrolyte obtained by compounding a non-aqueous electrolytic solution and a polymer material may be used as the non-aqueous electrolyte as an alternative to the electrolytic solution. In this case, the electrolyte and the organic solvent described above are used. Furthermore, examples of the polymer material include polyvinylidene fluoride (PVdF), polyacrylonitrile (PAN), and polyethylene oxide (PEO).

Moreover, in embodiments, a solid electrolyte such as a polymeric solid electrolyte and inorganic solid electrolyte may be used as the non-aqueous electrolyte as an alternative to the electrolytic solution. In this case, there is no need to provide the separators 23 and 25 in the electrode assembly 10. In addition, the solid electrolyte is put between the positive electrode 21 and the negative electrode 22 as an alternative to the separators 23 and 25 in the electrode assembly 10. Due to this, in such an embodiment, the solid electrolyte electrically insulates the positive electrode 21 from the negative electrode 22. Furthermore, in embodiments, an aqueous electrolyte containing an aqueous solvent may be used as the electrolyte as an alternative to the non-aqueous electrolyte.

In the present embodiment, as shown in FIGS. 1, 2, a pair of electrode terminals 27A and 27B are attached to an outer surface of the lid member 6, i.e., a surface of the lid member 6 facing an opposite side to the bottom wall 7. In the example of FIGS. 1, 2, and the like, the electrode terminal 27A serves as a positive-electrode terminal of the battery 1, and the electrode terminal 27B serves as a negative-electrode terminal of the battery 1. Each of the electrode terminals 27A and 27B includes a head portion 31 and a shaft portion 32. Each of the electrode terminals 27A and 27B is attached to the outer surface of the lid member 6 in a state in which the head portion 31 is exposed to an outside of the outer portion 3. In the present embodiment, the electrode terminals 27A and 27B are apart from each other in the lateral direction. In addition, a central position of the battery 1 in the lateral direction is located between the electrode terminals 27A and 27B. Each of the electrode terminals 27A and 27B is formed from a conductive material, e.g., any of aluminum, copper, and stainless steel.

Furthermore, a pair of through-holes 33A and 33B are formed in the lid member 6. The through-holes 33A and 33B are apart from each other in the lateral direction. In addition, the central position of the battery 1 in the lateral direction is located between the through-holes 33A and 33B. Furthermore, each of the through-holes 33A and 33B is formed along the thickness direction of the lid member 6, i.e., along the height direction of the battery 1, and passes through the lid member 6. The shaft portion 32 of the electrode terminal 27A is inserted into the through-hole 33A, while the shaft portion 32 of the electrode terminal 27B is inserted into the through-hole 33B.

Moreover, a pair of insulating members (outer insulating members) 28A and 28B each formed from an electrically insulating material are provided on the outer surface of the lid member 6. The insulating member 28A lies between the outer surface of the lid member 6 and the electrode terminal 27A, while the insulating member 28B lies between the outer surface of the lid member 6 and the electrode terminal 27B. Due to this, the insulating members 28A and 28B are apart from each other in the lateral direction, and the central position of the battery 1 in the lateral direction is located between the insulating members 28A and 28B. Furthermore, an insulating gasket 35A is disposed in the through-hole 33A of the lid member 6 between the shaft portion 32 of the electrode terminal 27A and the lid member 6. In addition, an insulating gasket 35B is disposed in the through-hole 33B between the shaft portion 32 of the electrode terminal 27B and the lid member 6. The insulating member 28A and the insulating gasket 35A prevent contact of the electrode terminal 27A with the lid member 6 and electrically insulate the electrode terminal 27A from the lid member 6 (outer portion 3). In addition, the insulating member 28B and the insulating gasket 35B prevent contact of the electrode terminal 27B with the lid member 6 and electrically insulate the electrode terminal 27B from the lid member 6 (outer portion 3).

In the internal cavity 11, an electrode holding member 36 is disposed between the electrode assembly 10 and the lid member 6 in the height direction of the battery 1. The electrode holding member (also an internal insulating member) 36 is formed from a material having electrical insulating properties. A pair of through-holes 37A and 37B are formed in the electrode holding member 36. The through-holes 37A and 37B are apart from each other in the lateral direction. In addition, the central position of the battery 1 in the lateral direction is located between the through-holes 37A and 37B. Furthermore, each of the through-holes 37A and 37B is formed along the height direction of the battery 1 and passes through the electrode holding member 36. The shaft portion 32 of the electrode terminal 27A is inserted into the through-hole 37A, while the shaft portion 32 of the electrode terminal 27B is inserted into the through-hole 37B.

Figure 4:
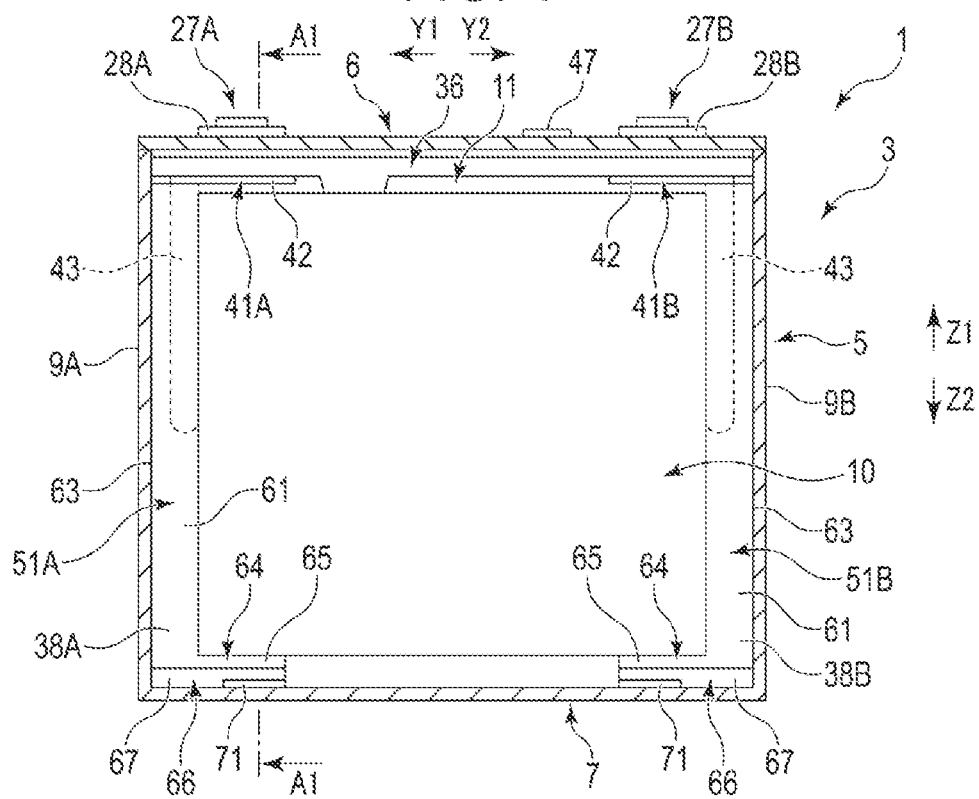
FIG. 4 is a schematic diagram showing configurations of an internal cavity in the battery shown in FIG. 1.
Figure 5:
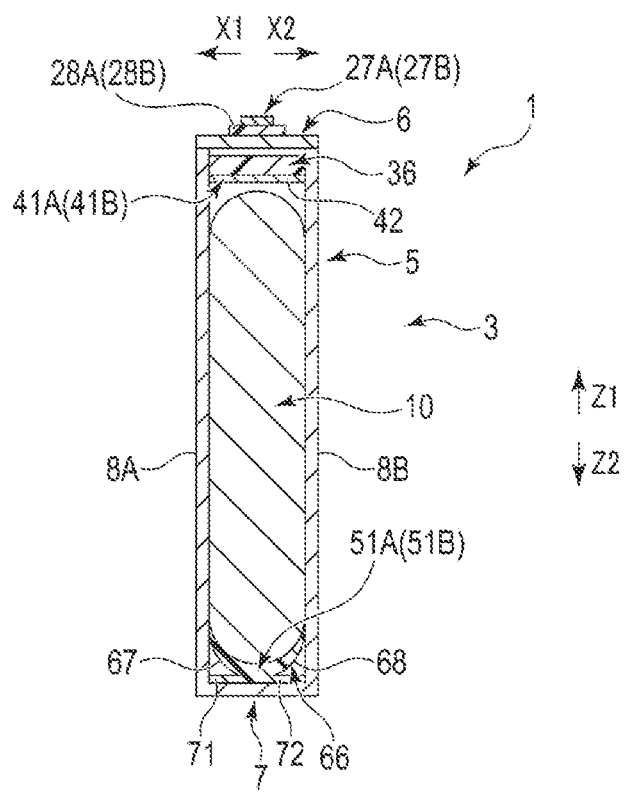
FIG. 5 is a cross-sectional view schematically showing a cross-section taken along line A1-A1 of FIG. 4.

FIG. 4 shows a configuration of the internal cavity 11 of the battery 1 of FIG. 1. Furthermore, FIG. 5 shows a cross-section taken along line A1-A1 of FIG. 4. As shown in FIG. 4 and the like, spaces 38A and 38B are formed on both sides of the electrode assembly 10 in the lateral direction in the internal cavity 11. The space (first space) 38A is formed between an inner surface of the side wall 9A that is one of the third side wall and the fourth side wall and the electrode assembly 10, while the space (second space) 38B is formed between an inner surface of the side wall 9B that is the other side wall that is the third side wall or the fourth side wall and the electrode assembly 10. That is, each of a pair of spaces 38A and 38B is formed between corresponding ones of the side walls 9A and 9B and the electrode assembly 10. Furthermore, in the example of FIGS. 1 to 5, each of the spaces 38A and 38B is formed between the electrode holding member 36 and the bottom wall 7 in the height direction.

The positive-electrode current collection tab 21D of the electrode assembly 10 is bundled by welding such as ultrasonic welding in the space 38A. Furthermore, one or more positive-electrode leads such as a backup lead 40A and a lead 41A are disposed in the space 38A. The positive-electrode current collection tab 21D is electrically connected to the positive-electrode terminal, e.g., 27A that is a corresponding one of the electrode terminals 27A and 27B via the positive-electrode leads 41A. 40A. At this time, the positive-electrode leads 41A, 40A are connected to the shaft portion 32 of the positive-electrode terminal, e.g., 27A in the space 38A. In addition, a connection between the positive-electrode current collection tab 21D and the positive-electrode leads 41A, 40A, a connection between the positive-electrode leads 41A, 40A, and a connection between the positive-electrode leads 41A, 40A and the positive-electrode terminal, e.g., 27A are established by welding such as ultrasonic welding. The positive-electrode leads 41A, 40A are formed herein from a metal having conductivity. Furthermore, the electrode holding member 36 prevents contact of the positive-electrode current collection tab 21D and the positive-electrode leads, e.g., 40A and 41A, with the inner surface of the lid member 6, and electrically insulates the positive-electrode current collection tab 21D and the positive-electrode leads, e.g., 40A and 41A, from the lid member 6.

Likewise, the negative-electrode current collection tab 22D of the electrode assembly 10 is bundled by welding such as ultrasonic welding in the space 38B. Furthermore, one or more negative-electrode leads such as a backup lead 40B and a lead 41B are disposed in the space 38B. The negative-electrode current collection tab 22D is electrically connected to the negative-electrode terminal, e.g., 27B that is a corresponding one of the electrode terminals 27A and 27B via the negative-electrode leads. At this time, the negative-electrode leads 41B, 40B are connected to the shaft portion 32 of the negative-electrode terminal, e.g., 27B, in the space 38B. In addition, a connection between the negative-electrode current collection tab 22D and the negative-electrode leads 41B, 40B, a connection between the negative-electrode leads 41B, 40B, and a connection between the negative-electrode leads 41B, 40B and the negative-electrode terminal, e.g., 27B, are established by welding such as ultrasonic welding. The negative-electrode leads 41B, 40B are formed herein from a metal having conductivity. Furthermore, the electrode holding member 36 prevents contact of the negative-electrode current collection tab 22D and the negative-electrode leads, e.g., 40B and 41B, with the inner surface of the lid member 6, and electrically insulates the negative-electrode current collection tab 22D and the negative-electrode leads, e.g., 40B and 41B, from the lid member 6.

In the example of FIGS. 1 to 5 and the like, each of the leads 41A and 41B includes a base portion 42 and a pair of extension portions 43. In each of the leads 41A and 41B, the base portion 42 extends along the lateral direction of the battery 1 and abuts on the electrode holding member 36 from the side on which the bottom wall 7 is located. In addition, in each of the leads 41A and 41B, the base portion 42 is connected to the corresponding one of the electrode terminals 27A and 27B. Furthermore, in the example of FIGS. 1 to 5 and the like, in each of the leads 41A and 41B, the pair of extension portions 43 extend from the base portion 42 toward the side on which the bottom wall 7 is located along the height direction. In addition, in each of the leads 41A and 41B, the pair of extension portions 43 are apart from each other in the longitudinal direction. Due to this, each of the leads 41A and 41B is formed into a fork shape. The extension portions 43 of the lead 41A are connected to the positive-electrode current collection tab 21D via the backup lead 40A. In addition, the extension portions 43 of the lead 41B are connected to the negative-electrode current collection tab 22D via the backup lead 40B.

It is noted that in one example, in each of the leads 41A and 41B, only one extension portion, e.g., 43 may extend from the base portion, e.g., 42 toward the side on which the bottom wall 7 is located along the height direction. In this case, the extension portion, e.g., 43 of each of the leads 41A and 41B is similarly connected to the corresponding one of the current collection tabs 21D and 22D via the corresponding one of the backup leads 40A and 40B. Furthermore, in another example, there is no need to provide the backup leads 40A and 40B. In this case, the leads 41A and 41B are directly connected to the corresponding current collection tabs 21D and 22D, respectively.

Moreover, in the example of FIGS. 1 to 5 and the like, a gas release valve 45 and a liquid inlet 46 are formed in the lid member 6. The gas release valve 45 and the liquid inlet 46 are disposed between the electrode terminals 27A and 27B in the lateral direction. A sealing plate 47 blocking the liquid inlet 46 is welded on the outer surface of the liquid inlet 46. Furthermore, a through-hole 48 and an opening hole 49 are formed in the electrode holding member 36. The through-hole 48 and the opening hole 49 are formed along the height direction of the battery 1 and pass through the electrode holding member 36. Furthermore, the through-hole 48 and the opening hole 49 are disposed between the through-holes 37A and 37B in the lateral direction. In the electrode holding member 36, the through-hole 48 is formed at a position opposed to the liquid inlet 46 and the opening hole 49 is formed at a position opposed to the gas release valve 45.

Moreover, in the internal cavity 11 of the battery 1, an insulation guard, i.e., a positive-electrode-side insulation guard 51A, is disposed in the space 38A and an insulation guard, i.e., a negative-electrode-side insulation guard 51B, is disposed in the space 38B. The insulation guard 51A is fixed to the electrode assembly 10 by an insulating tape 52A and the insulation guard 51B is fixed to the electrode assembly 10 by an insulating tape 52B. Each of the insulation guards 51A and 51B and the insulating tapes 52A and 52B is formed from a material having electrical insulating properties. The insulation guard 51A is disposed on an inner surface of the outer container 5 in the space 38A and prevents contact of the positive-electrode leads, e.g., 40A and 41A and the positive-electrode current collection tab 21D with the inner surface of the outer container 5. In addition, the insulation guard 51B is disposed on the inner surface of the outer container 5 in the space 38B and prevents contact of the negative-electrode leads, e.g., 40B and 41B and the negative-electrode current collection tab 22D with the inner surface of the outer container 5. The insulation guard 51A, therefore, electrically insulates the positive-electrode leads, e.g., 40A and 41A and the positive-electrode current collection tab 21D from the inner surface of the outer container 5. Furthermore, the insulation guard 51B electrically insulates the negative-electrode leads, e.g., 40B and 41B and the negative-electrode current collection tab 22D from the inner surface of the outer container 5. In the space 38A, the insulation guard 51A extends over an inner surface of the bottom wall 7, an inner surface of the side wall, which is one of the first side wall and the second side wall, 8A, an inner surface of the side wall, which is the other of the first side wall and the second side wall, 8B, and an inner surface of the side wall, which is one of the third side wall and the fourth side wall, 9A. In the space 38B, the insulation guard 51B extends over the inner surface of the bottom wall 7, the inner surface of the side wall 8A, the inner surface of the side wall 8B, and an inner surface of the side wall, which is the other of the third and fourth side walls. 9B.

FIGS. 6 to 9 show configurations of each of the insulation guards 51A and 51B. As shown in FIGS. 1 and 4 to 9, each of the insulation guards 51A and 51B includes a guard side plate portion 61 that serves as one of a first guard side plate portion and a second guard side plate portion and a guard side plate portion 62 that serves as the rest of the first guard side plate portion and the second guard side plate portion. Furthermore, each of the insulation guards 51A and 51B includes a guard side plate portion 63 that serves as a third guard side plate portion. The guard side plate portion 61 of each of the insulation guards 51A and 51B is disposed on the inner surface of the side wall 8A, which is one of the first side wall and the second side wall, in a corresponding one of the spaces 38A and 38B. Due to this, the guard side plate portion 61 of each of the insulation guards 51A and 51B lies between a corresponding one of the leads 41A and 41B and the inner surface of the side wall 8A in the longitudinal direction. Furthermore, the guard side plate portion 62 of each of the insulation guards 51A and 51B is disposed on the inner surface of the side wall, which is the other of the first side wall and the second side wall, 8B in a corresponding one of the spaces 38A and 38B. Due to this, the guard side plate portion 62 of each of the insulation guards 51A and 51B lies between a corresponding one of the leads 41A and 41B and the inner surface of the side wall 8B in the longitudinal direction.

The guard side plate portion 63 of the insulation guard 51A is disposed on the inner surface of the side wall, which is one of the third side wall and the fourth side wall, 9A in the space 38A. Due to this, the guard side plate portion 63 of the insulation guard 51A lies between the lead 41A and the inner surface of the side wall 9A in the lateral direction. Furthermore, the guard side plate portion 63 of the insulation guard 51B is disposed on the inner surface of the side wall, which is the other of the third side wall and the fourth side wall, 9B in the space 38B. Due to this, the guard side plate portion 63 of the insulation guard 51B lies between the lead 41B and the inner surface of the side wall 9B in the lateral direction. Moreover, in each of the insulation guards 51A and 51B, the guard side plate portions 61 to 63 extend along the height direction. In addition, in the space 38A, the guard side plate portions 61 to 63 of the insulation guard 51A continuously extend from an end portion on the side on which the lid member 6 is located to an end portion on which the bottom wall 7 is located. Likewise, in the space 38B, the guard side plate portions 61 to 63 of the insulation guard 51B continuously extend from the end portion on the side on which the lid member 6 is located to the end portion on which the bottom wall 7 is located.

Furthermore, in each of the insulation guards 51A and 51B, the guard side plate portions 61 to 63 form a dent shape recessed outward in the lateral direction. That is, in each of the insulation guards 51A and 51B, the guard side plate portions 61 to 63 form a dent shape recessed toward an opposite side to a side on which the electrode assembly 10 is located in the lateral direction. In the space 38A, the positive-electrode current collection tab 21D and the positive-electrode leads, e.g., 40A and 41A are inserted into the dent shape formed by the guard side plate portions 61 to 63 of the insulation guard 51A. Likewise, in the space 38B, the negative-electrode current collection tab 22D and the negative-electrode leads, e.g., 40B and 41B are inserted into the dent shape formed by the guard side plate portions 61 to 63 of the insulation guard 51B.

Furthermore, in the example of FIG. 1 and the like, each of the insulation guards 51A and 51B includes a guard bottom plate portion 64 as well as the guard side plate portions 61 to 63 described above. The guard bottom plate portion 64 of each of the insulation guards 51A and 51B is disposed on the inner surface of the bottom wall 7. Due to this, the guard bottom plate portion 64 of each of the insulation guards 51A and 51B lies between a corresponding one of the leads 41A and 41B and the inner surface of the bottom wall 7 in the height direction. In each of the insulation guards 51A and 51B, the guard bottom plate portion 64 is connected to end portions of the guard side plate portions 61 to 63 on the side on which the bottom wall 7 is located. In addition, in each of the insulation guards 51A and 51B, the guard bottom plate portion 64 extends from the guard side plate portions 61 to 63 inward in the lateral direction, i.e., toward the side on which the electrode assembly 10 is located in the lateral direction.

Moreover, in each of the insulation guards 51A and 51B, a guard protruding portion 65 is formed in the guard bottom plate portion 64. In each of the insulation guards 51A and 51B, the guard protruding portion 65 protrudes toward the side on which the electrode assembly 10 is located in the lateral direction with respect to the guard side plate portions 61 and 62, i.e., protrudes inward in the lateral direction. The guard protruding portion 65 of each of the insulation guards 51A and 51B is disposed between the electrode assembly 10 and the inner surface of the bottom wall 7 in the internal cavity 11. In addition, the guard protruding portion 65 of each of the insulation guards 51A and 51B supports the electrode assembly 10 from the side on which the bottom wall 7 is located in the height direction. That is, the guard protruding portion 65 of each of the insulation guards 51A and 51B abuts on the electrode assembly 10 from the side on which the bottom wall 7 is located. In the example of FIG. 4 and the like, a protruding end of the guard protruding portion 65 of the insulation guard 51A is located apart from a protruding end of the guard protruding portion 65 of the insulation guard 51B in the lateral direction.

Figure 6:
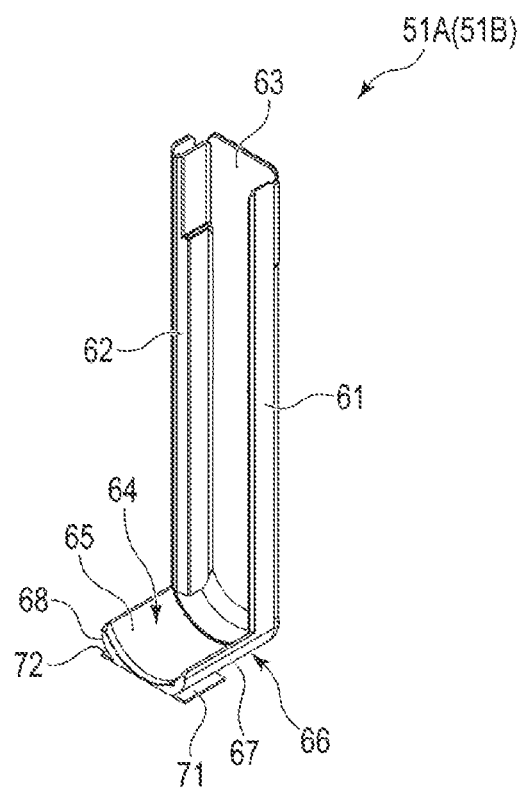
FIG. 6 is a perspective view schematically showing configurations of an insulation guard in the battery according to the first embodiment.
Figure 7:
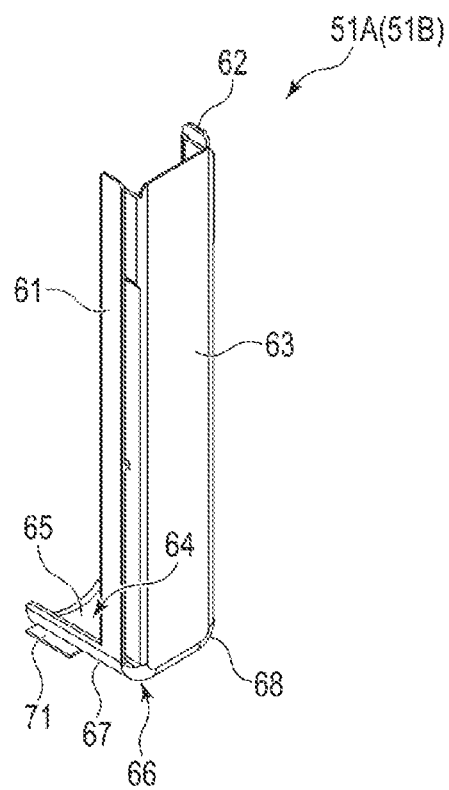
FIG. 7 is a perspective view schematically showing the insulation guard of FIG. 6 in a state of viewing the insulation guard from a direction different from a direction of FIG. 6.
Figure 8:
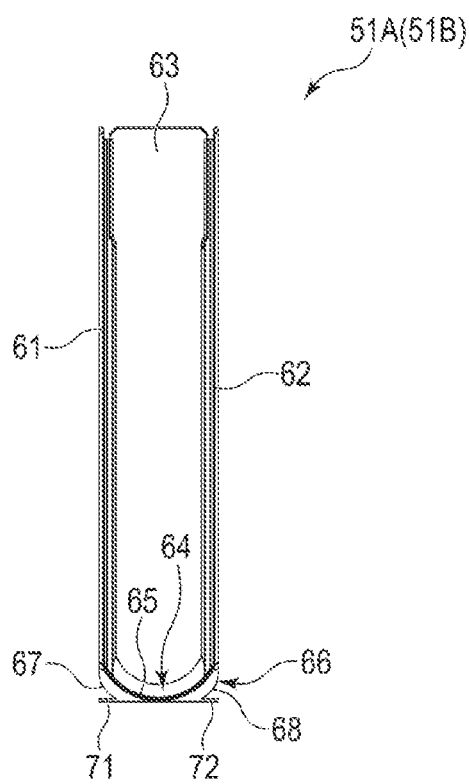
FIG. 8 is a schematic diagram showing the insulation guard of FIG. 6 in a state of viewing the insulation guard from a side to which a guard protruding portion protrudes.
Figure 9:
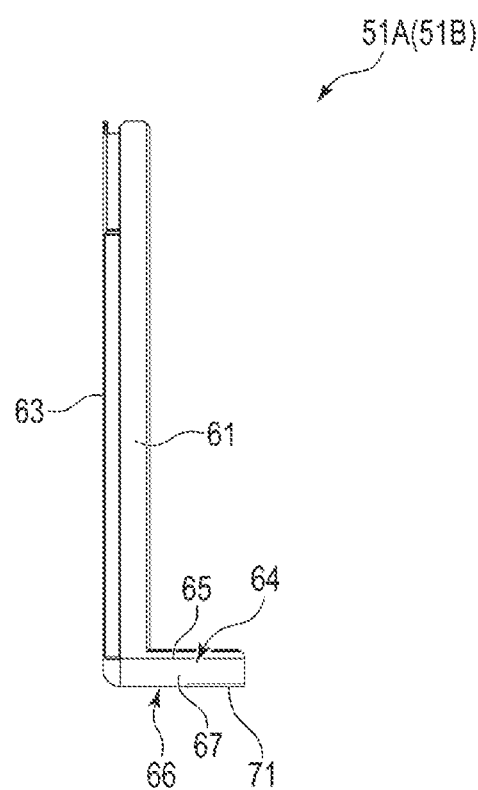
FIG. 9 is a schematic diagram showing the insulation guard of FIG. 6 in a state of viewing the insulation guard from a side to which an outer surface of a guard side plate portion (one of a first guard side plate portion and a second guard side plate portion) faces.

FIGS. 6 and 7 are perspective views showing the insulation guard 51A (51B) viewed from different directions from each other. Furthermore, FIG. 8 shows the insulation guard 51A (51B) viewed from aside on which the guard protruding portion 65 protrudes. In addition. FIG. 9 shows the insulation guard 51A (51B) from a side to which an outer surface of the guard side plate portion, which is one of the first guard side plate portion and the second guard side plate portion, 61 faces.

Furthermore, in each of the insulation guards 51A and 51B, the guard bottom plate portion 64 includes a guard bottom surface 66 facing to the side on which the bottom wall 7 is located. The guard bottom surface 66 of each of the insulation guards 51A and 51B is opposed to the inner surface of the bottom wall 7. Moreover, on the guard bottom surface 66 of each of the insulation guards 51A and 51B, an inclined surface 67 is formed as one of a first inclined surface and a second inclined surface and an inclined surface 68 is formed as the other of the first inclined surface and the second inclined surface. On the guard bottom surface 66 of each of the insulation guards 51A and 51B, the inclined surface 67 forms an edge on a side on which the side wall, which is one of the first side wall and the second side wall, 8A is located. In addition, on the guard bottom surface 66 of each of the insulation guards 51A and 51B, the inclined surface 68 forms an edge on a side on which the side wall, which is the other of the first side wall and the second side wall, 8B is located. In the example of FIGS. 1, 4, and the like, in each of the insulation guards 51A and 51B, the inclined surfaces 67 and 68 extend along a protrusion direction of the guard protruding portion 65, i.e., along the lateral direction. In addition, in the guard bottom plate portion 64 of each of the insulation guards 51A and 51B, the inclined surfaces 67 and 68 continuously extend over an entire length or a substantially entire length in the lateral direction.

The inclined surface 67 inclines in a state of being farther from the bottom wall 7 in the height direction as being closer to the side wall 8A in the longitudinal direction. In addition, the inclined surface 68 inclines in a state of being farther from the bottom wall 7 in the height direction as being closer to the side wall 8B in the longitudinal direction. In each of the insulation guards 51A and 51B, therefore, each of the inclined surfaces 67 and 68 inclines in a state of being farther from the bottom wall 7 in the height direction as extending outward in the longitudinal direction.

In the example of FIGS. 1, 4, and the like, in each of the insulation guards 51A and 51B, each of the inclined surfaces 67 and 68 is formed into an inclined curve shape. In addition, in each of the insulation guards 51A and 51B, each of the inclined surfaces 67 and 68 has a circular arc shape or a substantially circular arc shape in a cross-section perpendicular to or substantially perpendicular to the protrusion direction of the guard protruding portion 65, i.e., in the lateral direction of the battery 1. In, however, that one example, in each of the insulation guards 51A and 51B, each of the inclined surfaces 67 and 68 may be formed into an inclined plane shape. In this case, in each of the insulation guards 51A and 51B, each of the inclined surfaces 67 and 68 similarly inclines in the state of being farther from the bottom wall 7 in the height direction as extending outward in the longitudinal direction.

Moreover, the battery 1 includes two protrusions 71 each as one of a first protrusion and a second protrusion and two protrusions 72 each as the other of the first protrusion and the second protrusion. Each of the protrusions 71 is connected to a corresponding one of the insulation guards 51A and 51B and protrudes from the corresponding one of the insulation guards 51A and 51B. In the example of FIG. 1 and the like, one protrusion 71 protrudes from each of the insulation guards 51A and 51B. Furthermore, each of the protrusions 72 is connected to a corresponding one of the insulation guards 51A and 51B and protrudes from the corresponding one of the insulation guards 51A and 51B. In the example of FIG. 1 and the like, one protrusion 72 protrudes from each of the insulation guards 51A and 51B.

Each of the protrusions 71 protrudes from the corresponding one of the insulation guards 51A and 51B toward a boundary portion between the side wall, which is one of the first side wall and the second side wall, 8A and the bottom wall 7. In addition, a protruding end of each of the protrusions 71 abuts on the boundary portion between the side wall 8A and the bottom wall 7. That is, the protruding end of each of the protrusions 71 abuts on a corner portion or edge between the side wall 8A and the bottom wall 7. Furthermore, each of the protrusions 72 protrudes from the corresponding one of the insulation guards 51A and 51B toward a boundary portion between the side wall, which is the other of the first side wall and the second side wall, 8B and the bottom wall 7. In addition, a protruding end of each of the protrusions 72 abuts on the boundary portion between the side wall 8B and the bottom wall 7. That is, the protruding end of each of the protrusions 72 abuts on a corner portion or edge between the side wall 8B and the bottom wall 7.

In the example of FIGS. 1, 4, and 5, each of the protrusions 71 and 72 is formed integrally with the corresponding one of the insulation guards 51A and 51B and is formed from a material having electrical insulating properties. Furthermore, each of the protrusions 71 protrudes from the corresponding one of the insulation guards 51A and 51B toward the side on which the side wall 8A is located in the longitudinal direction. In addition, each of the protrusion 72 protrudes from the corresponding one of the insulation guards 51A and 51B toward the side on which the side wall 8B is located in the longitudinal direction. In addition, each of the protrusions 71 and 72 protrudes from the corresponding one of the insulation guards 51A and 51B outward in the longitudinal direction.

Moreover, in each of the insulation guards 51A and 51B, the protrusion 71 protrudes from the guard protruding portion 65 of the guard bottom plate portion 64 toward the boundary portion between the side wall 8A and the bottom wall 7. In addition, in each of the insulation guards 51A and 51B, the protrusion 72 protrudes from the guard protruding portion 65 of the guard bottom plate portion 64 toward the boundary portion between the side wall 8B and the bottom wall 7. Furthermore, in each of the insulation guards 51A and 51B, the protrusion 71 protrudes from the inclined surface, which is one of the first inclined surface and the second inclined surface, 67 of the guard bottom surface 66 toward the boundary portion between the side wall 8A and the bottom wall 7. In addition, in each of the insulation guards 51A and 51B, the protrusion 72 protrudes from the inclined surface, which is the other of the first inclined surface and the second inclined surface, 68 of the guard bottom surface 66 toward the boundary portion between the side wall 8B and the bottom wall 7.

In the example of FIGS. 1, 4, 5, and the like, each of the protrusions 71 and 72 is formed into a plate shape. In addition, a width direction of each of the plate-like protrusions 71 and 72 is along the lateral direction of the battery 1, and a thickness direction of each of the plate-like protrusions 71 and 72 is along the height direction of the battery 1. In one example, each of the protrusions 71 and 72 is formed into the plate shape at a thickness of approximately 0.5 mm. Furthermore, each of the protrusions 71 is disposed between the inclined surface 67 of corresponding one of the insulation guards 51A and 51B and the inner surface of the bottom wall 7 in the height direction. In addition, a gap is formed between each of the protrusions 71 and the inclined surface 67 of the corresponding one of the insulation guards 51A and 51B. Moreover, each of the protrusions 72 is disposed between the inclined surface 68 of the corresponding one of the insulation guards 51A and 51B and the inner surface of the bottom wall 7 in the height direction. In addition, a gap is formed between each of the protrusions 72 and the inclined surface 68 of the corresponding one of the insulation guards 51A and 51B. Because of formation of the protrusions 71 and 72 as described above, the protrusions 71 and 72 are elasticity deformable.

Next, operations and advantageous effects of the battery 1 according to the present embodiment will be described. In the battery 1, built-in structures such as the electrode assembly 10 accommodated in the internal cavity 11 are constrained by the peripheral wall 4 and the like of the outer container 5. For example, movements of the built-in structures such as the electrode assembly 10 in the longitudinal direction are constrained by the side walls, which are the first side wall and the second side wall, 8A and 8B. By constraining the built-in structures, an influence of an external shock on the built-in structures including the electrode assembly 10, the current collection tabs 21D and 22D, the leads 40A, 40B. 41A, and 41B, and the insulation guards 51A and 51B is reduced.

Moreover, when the battery 1 is used, a gas may be produced from the electrode assembly 10 in the internal cavity 11. As a result of producing a gas in the internal cavity 11, the outer container 5 expands. Here, in the battery 1, an area of an outer surface of each of the side walls 8A and 8B is far larger than areas of outer surfaces of the bottom wall 7, the side walls 9A and 9B, and the lid member 6. Due to this, as a result of producing the gas in the internal cavity 11, each of the side walls 8A and 8B expands outward. Particularly in a case of a large-sized battery 1, an amount of expansion of each of the side walls 8A and 8B due to the producing of the gas increases.

Figure 10:
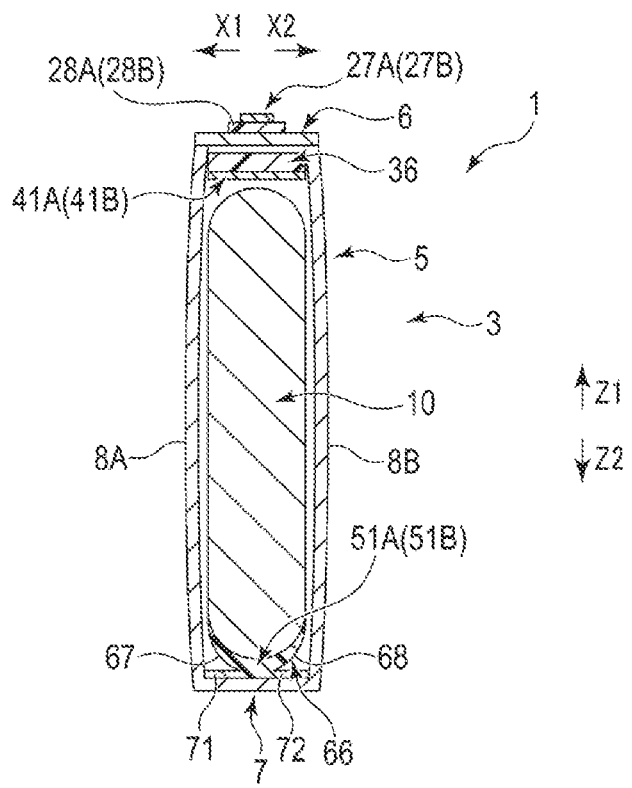
FIG. 10 is a cross-sectional view schematically showing a state in which side walls (long side walls) expand in the battery of FIG. 1.

FIG. 10 shows a state in which each of the side walls (long side walls) 8A and 8B expands by a gas produced in the internal cavity 11. As shown in FIG. 10, when a gas is produced, a central portion of each of the side walls 8A and 8B greatly expands in the height direction. Due to this, the central portion of each of the side walls 8A and 8B in the height direction has a gap with the electrode assembly 10 and the side walls 8A and 8B do not constrain the electrode assembly 10. Nevertheless, even when each of the side walls 8A and 8B expands due to producing the gas, an end portion of the side wall 8A on the side on which the bottom wall 7 is located either does not expand or hardly expands. Likewise, an end portion of the side wall 8B on the side on which the bottom wall 7 is located either does not expand or hardly expands. That is, even when the gas is produced in the internal cavity 11, the boundary portion (corner portion) between the side wall 8A and the bottom wall 7 and areas around the boundary portion and the boundary portion (corner portion) between the side wall 8B and the bottom wall 7 and areas around the boundary portion either do not expand or hardly expand.

The boundary portion (corner portion) between the side wall 8A and the bottom wall 7 and areas around the boundary portion either do not expand or hardly expand. Due to this, even when the gas is produced in the internal cavity 11, the protruding end of each of the protrusions 71 abuts on the boundary portion between the side wall 8A and the bottom wall 7. Likewise, the boundary portion (corner portion) between the side wall 8B and the bottom wall 7 and areas around the boundary portion either do not expand or hardly expand. Due to this, even when the gas is produced in the internal cavity 11, the protruding end of each of the protrusions 72 abuts on the boundary portion between the side wall 8B and the bottom wall 7. Here, each of the protrusions 71 and 72 is connected to a corresponding one of the insulation guards 51A and 51B, and is integrally formed with the corresponding one of the insulation guards 51A and 51B in the present embodiment. In addition, the insulation guards 51A and 51B are attached to the electrode assembly 10. Each of the protrusions 71 abuts on the boundary portion between the side wall 8A and the bottom wall 7 and the protruding end of each of the protrusions 72 abuts on the boundary portion between the side wall 8B and the bottom wall 7. This can constrain the movements of the built-in structures such as the electrode assembly 10 and the insulation guards 51A and 51B in the longitudinal direction.

By providing the protrusions 71 and 72 as described above, the movements of the built-in structures such as the electrode assembly 10 in the longitudinal direction are constrained even when the gas is produced in the internal cavity 11. That is, even when the outer container 5 expands due to producing the gas, the built-in structures are appropriately constrained. This can suppress the influence of an external shock on the built-in structures including the electrode assembly 10, the current collection tabs 21D and 22D, the leads 40A, 40B, 41A, and 41B, and the insulation guards 51A and 51B even when the gas is produced. Suppressing the influence of an external shock on the built-in structures makes it possible to prevent damage of the built-in structures due to the external shock and to improve durability of the built-in structures.

Moreover, in the present embodiment, the protrusions 71 and 72 protrude from the guard protruding portion 65 in each of the insulation guards 51A and 51B. In addition, the guard protruding portion 65 of each of the insulation guards 51A and 51B is disposed between the electrode assembly 10 and the inner surface of the bottom wall 7, and supports the electrode assembly 10 from the side on which the bottom wall 7 is located in the height direction. In each of the insulation guards 51A and 51B, the protrusions 71 and 72 are connected to the guard protruding portion 65 supporting the electrode assembly 10. Therefore, the protrusions 71 and 72 constrain the movement of the electrode assembly 10 (a built-in structure) in the longitudinal direction more reliably.

Furthermore, at a time of manufacturing the battery 1, the electrode terminals 27A and 27B, the insulating members 28A and 28B, the insulating gaskets 35A and 35B, and the electrode holding member 36 are attached to the lid member 6. In addition, each of the current collection tabs 21D and 22D of the electrode assembly 10 is connected to a corresponding one of the electrode terminals 27A and 27B via the corresponding one of positive-electrode leads, e.g., 40A and 41A or negative-electrode leads, e.g., 40B and 41B. Additionally, each of the insulation guards 51A and 51B is attached or fixed to the electrode assembly 10 via a corresponding one of the insulation tapes 52A and 52B. In addition, the built-in structures including the electrode assembly 10, the current collection tabs 21D and 22D, the leads 40A, 40B, 41A, and 41B, and the insulation guards 51A and 51B are inserted into the internal cavity 11 of the outer container 5 in a state of assembling the electrode assembly 10, the insulation guards 51A and 51B, the lid member 6, and the like as described above. Additionally, in the state of inserting the built-in structures into the internal cavity 11, the lid member 6 is attached to the peripheral wall 4 of the outer container 5 by welding or the like of the lid member 6 with an end portion of the peripheral wall 4 on the opposite side to the bottom wall 7.

Figure 11:
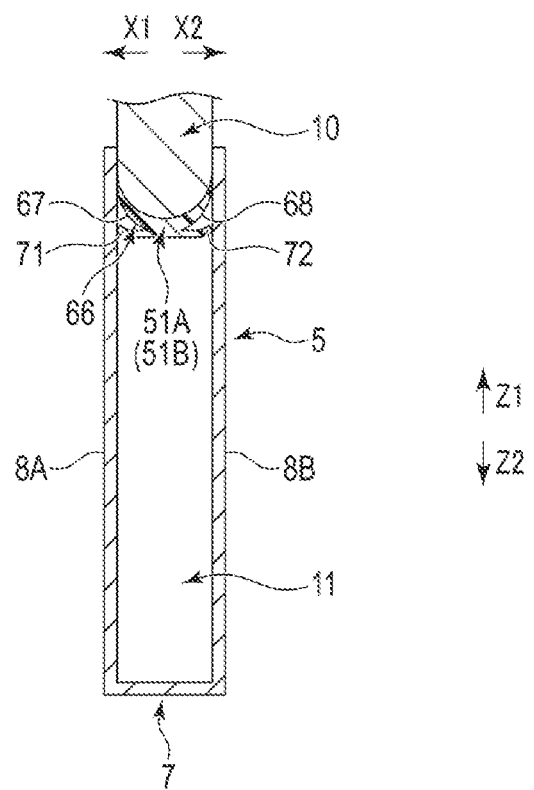
FIG. 11 is a cross-sectional view schematically showing a state of inserting built-in structures into the internal cavity at a time of manufacturing the battery of FIG. 1.

FIG. 11 shows the state of inserting the built-in structures such as the electrode assembly 10 into the internal cavity 11 at the time of manufacturing the battery 1. As shown in FIG. 11, in the state of inserting the built-in structures into the internal cavity 11, each of the protrusions 71 abuts on the side wall 8A and each of the protrusions 72 abuts on the side wall 8B. In the present embodiment, each of the protrusions 71 and 72 protrudes from a corresponding one of the insulation guards 51A and 51B and is formed into the plate shape. Due to this, by abutment of each of the protrusions 71 on the side wall 8A, each of the protrusions 71 elastically deforms by a pressing force from the side wall 8A. Likewise, by abutment of each of the protrusions 72 on the side wall 8B, each of the protrusions 72 elastically deforms by a pressing force from the side wall 8B. Elastic deformation of the protrusions 71 and 72 in the state of inserting the built-in structures into the internal cavity 11 facilitates insertion of the built-in structures into the internal cavity 11. At the time of manufacturing the battery 1, therefore, it is possible to ensure insertability of the built-in structures into the internal cavity 11.

Moreover, in the present embodiment, the inclined surfaces 67 and 68 described above are formed on the guard bottom surface 66 in each of the insulation guards 51A and 51B. Due to this, in the state of inserting the built-in structures into the internal cavity 11, friction between each of the insulation guards 51A and 51B and the peripheral wall 4 (side walls 8A and 8B) is reduced. It is thereby possible to improve insertability of the built-in structures into the internal cavity 11 at the time of manufacturing the battery 1.

(Modifications)

Figure 12:
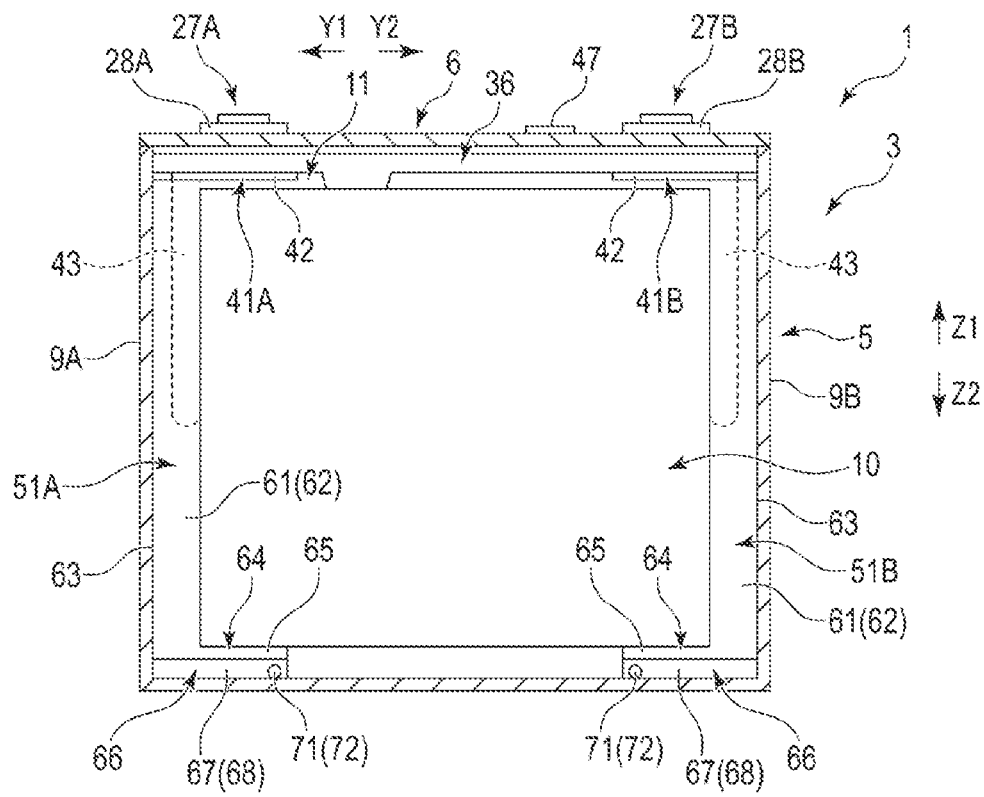
FIG. 12 is a schematic diagram showing configurations of an internal cavity in a battery according to a first modification.

While it is described in the preceding embodiment and the like that each of the protrusions 71 and 72 is formed into a plate shape with the width direction thereof being along the lateral direction of the battery 1, the disclosure is not limited to this case. In one modification, each of the protrusions 71 and 72 may be formed into a columnar shape or rod shape. For example, in a first modification shown in FIG. 12, each of the protrusions 71 and 72 is formed into a cylindrical shape extending along the longitudinal direction of the battery 1. In the present modification, each of the protrusions 71 and 72 similarly protrudes from a corresponding one of the insulation guards 51A and 51B outward in the longitudinal direction. In addition, the protruding end of each protrusion 71 abuts on the boundary portion between the side wall 8A and the bottom wall 7 and the protruding end of each protrusion 72 abuts on the boundary portion between the side wall 8B and the bottom wall 7.

Figure 13:
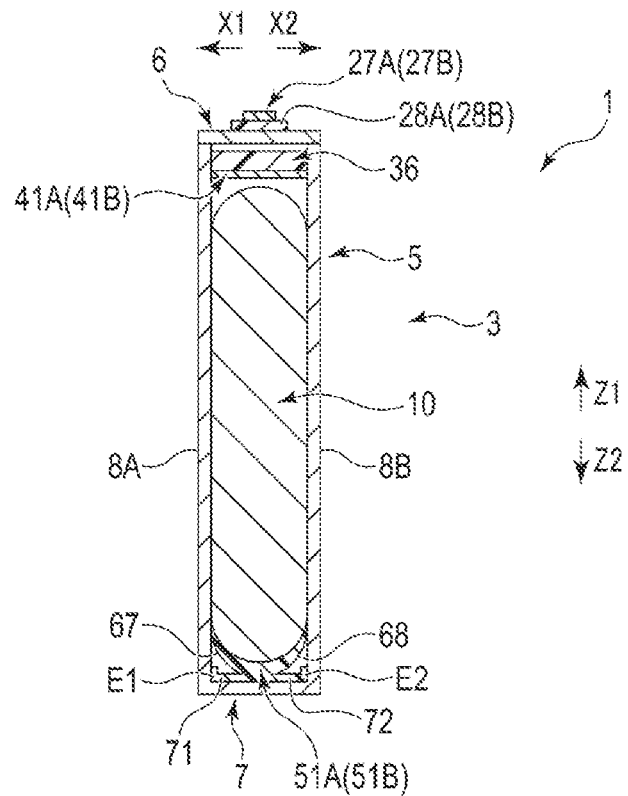
FIG. 13 is a cross-sectional view schematically showing configurations of an internal cavity in a battery according to a second modification.

Furthermore, in a second modification shown in FIG. 13, each of the protrusions 71 bends at a bend position E1 of the protruding end. In addition, each of the protrusions 72 bends at a bend position E2 of the protruding end. Each of the protrusions 71 extends along the protrusion direction from a corresponding one of the insulation guards 51A and 51B to the bend position E1, and extends outward in the longitudinal direction of the battery 1. Likewise, each of the protrusions 72 extends along the protrusion direction from a corresponding one of the insulation guards 51A and 51B to the bend position E2, and extends outward in the longitudinal direction of the battery 1. Furthermore, each of the protrusions 71 bends at the bend position E1 toward the side on which the lid member 6 is located in the height direction. Likewise, each of the protrusions 72 bends at the bend position E2 toward the side on which the lid member 6 is located in the height direction. In the present modification, similarly to the preceding embodiment, the protruding end of each of the protrusions 71 abuts on the boundary portion between the side wall 8A and the bottom wall 7, and the protruding end of each of the protrusions 72 abuts on the boundary portion between the side wall 8B and the bottom wall 7.

Figure 14:
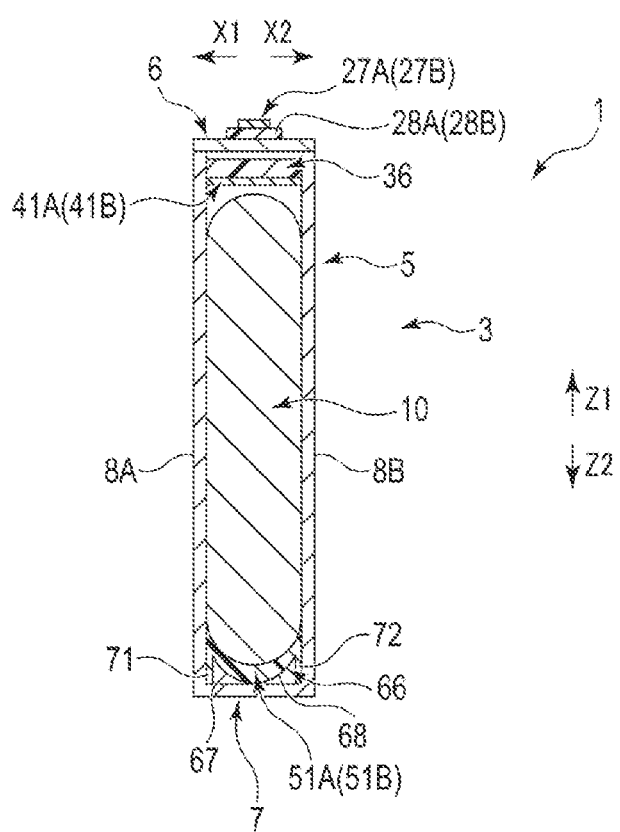
FIG. 14 is a cross-sectional view schematically showing configurations of an internal cavity in a battery according to a third modification.

Moreover, while it is described in the preceding embodiment and the like that each of the protrusions 71 and 72 protrudes from a corresponding one of the insulation guards 51A and 51B outward in the longitudinal direction, the disclosure is not limited to this case. For example, in a third modification shown in FIG. 14, each of the protrusions 71 and 72 protrudes from a corresponding one of the insulation guards 51A and 51B toward the side on which the bottom wall 7 is located in the height direction. In the present modification, each of the protrusions 71 and 72 is formed into the plate shape and the width direction of each of the plate-like protrusions 71 and 72 is along the lateral direction of the battery 1. The thickness direction of each of the plate-like protrusions 71 and 72 is along the longitudinal direction of the battery 1. In the present modification, similarly to the preceding embodiment, the protruding end of each of the protrusions 71 abuts on the boundary portion between the side wall 8A and the bottom wall 7, and the protruding end of each of the protrusions 72 abuts on the boundary portion between the side wall 8B and the bottom wall 7. Due to this, the present modification obtains similar operations and advantageous effects to those of the preceding embodiment and the like.

Furthermore, in one modification, similarly to the third modification, each of the protrusions 71 and 72 can protrude from a corresponding one of the insulation guards 51A and 51B toward the side on which the bottom wall 7 is located in the height direction. In the present modification, however, each of the protrusions 71 and 72 is formed into a columnar shape or a rod shape such as a cylindrical shape. In the present modification, similarly to the preceding embodiment, the protruding end of each of the protrusions 71 abuts on the boundary portion between the side wall 8A and the bottom wall 7, and the protruding end of each of the protrusions 72 abuts on the boundary portion between the side wall 8B and the bottom wall 7.

Moreover, in another modification, similarly to the third modification, each of the protrusions 71 and 72 can protrude from a corresponding one of the insulation guards 51A and 51B toward the side on which the bottom wall 7 is located in the height direction. In addition, each of the protrusions 71 and 72 can bend at the bend position of the protruding end. Each of the protrusions 71 and 72 extends along the protrusion direction from corresponding one of the insulation guards 51A and 51B toward the bend position and extends toward the side on which the bottom wall 7 is located in the height direction of the battery 1. Furthermore, each of the protrusions 71 and 72 can bend at the bend position inward in the longitudinal direction. In the present modification, similarly to the preceding embodiment, the protruding end of each of the protrusions 71 abuts on the boundary portion between the side wall 8A and the bottom wall 7, and the protruding end of each of the protrusions 72 abuts on the boundary portion between the side wall 8B and the bottom wall 7.

Moreover, while it is described in the preceding embodiment that each of the protrusions 71 and 72 is formed integrally with a corresponding one of the insulation guards 51A and 51B, the disclosure is not limited to this case. In one modification, each of the protrusions 71 and 72 can be coupled with a corresponding one of the insulation guards 51A and 51B. In the present modification, similarly to the preceding embodiment, each of the protrusions 71 and 72 is connected to a corresponding one of the insulation guards 51A and 51B and protrudes from the corresponding one of the insulation guards 51A and 51B. In addition, the protruding end of each protrusion 71 abuts on the boundary portion between the side wall 8A and the bottom wall 7 and the protruding end of each protrusion 72 abuts on the boundary portion between the side wall 8B and the bottom wall 7.

Furthermore, in one other modification, each of the protrusions 71 and 72 can be coupled with a corresponding one of the insulation guards 51A and 51B and formed from a metal. That is, the protrusions 71 and 72 are not necessarily formed from a material having electrical insulating properties. In this case, however, each of the insulation guards 51A and 51B is similarly formed from the material having electrical insulating properties.

Furthermore, while it is described in the preceding embodiment and the like that the protrusions 71 and 72 protrude from the insulation guard 51A one by one and the protrusions 71 and 72 protrude from the insulation guard 51B one by one, the disclosure is not limited to this case. That is, at least either a plurality of protrusions 71 or 72 may protrude from the insulation guard 51A and at least either a plurality of protrusions 71 or 72 may protrude from the insulation guard 51B. In one other modification, two or more protrusions 71 and two or more protrusions 72 can protrude from the insulation guard 51A. In another modification, two or more protrusions 71 and two or more protrusions 72 can protrude from the insulation guard 51B.

Moreover, while it is described in the preceding embodiment and that like that the protrusions 71 and 72 protrude from each of the two insulation guards 51A and 51B, the disclosure is not limited to this case. That is, each of the protrusions 71 and 72 may protrude only from one of the insulation guards 51A and 51B. In one other modification, each of the protrusions 71 and 72 protrudes only from the insulation guard 51A. In this case, the protrusion protruding from the insulation guard 51B toward the boundary portion between the side wall 8A and the bottom wall 7 and the protrusion protruding from the insulation guard 51B toward the boundary portion between the side wall 8B and the bottom wall 7 are not provided. In another modification, each of the protrusions 71 and 72 protrudes only from the insulation guard 51B. In this case, the protrusion protruding from the insulation guard 51A toward the boundary portion between the side wall 8A and the bottom wall 7 and the protrusion protruding from the insulation guard 51A toward the boundary portion between the side wall 8B and the bottom wall 7 are not provided.

Furthermore, in another modification, the protrusions 71 can protrude only from the insulation guard 51A and the protrusions 72 protrude only from the insulation guard 51B. In this case, the protrusion protruding from the insulation guard 51B toward the boundary portion between the side wall 8A and the bottom wall 7 and the protrusion protruding from the insulation guard 51A toward the boundary portion between the side wall 8B and the bottom wall 7 are not provided. In another modification, the protrusions 71 protrude only from the insulation guard 51B and the protrusions 72 protrude only from the insulation guard 51A. In this case, the protrusion protruding from the insulation guard 51A toward the boundary portion between the side wall 8A and the bottom wall 7 and the protrusion protruding from the insulation guard 51B toward the boundary portion between the side wall 8B and the bottom wall 7 are not provided.

[Battery Pack]

Figure 15:
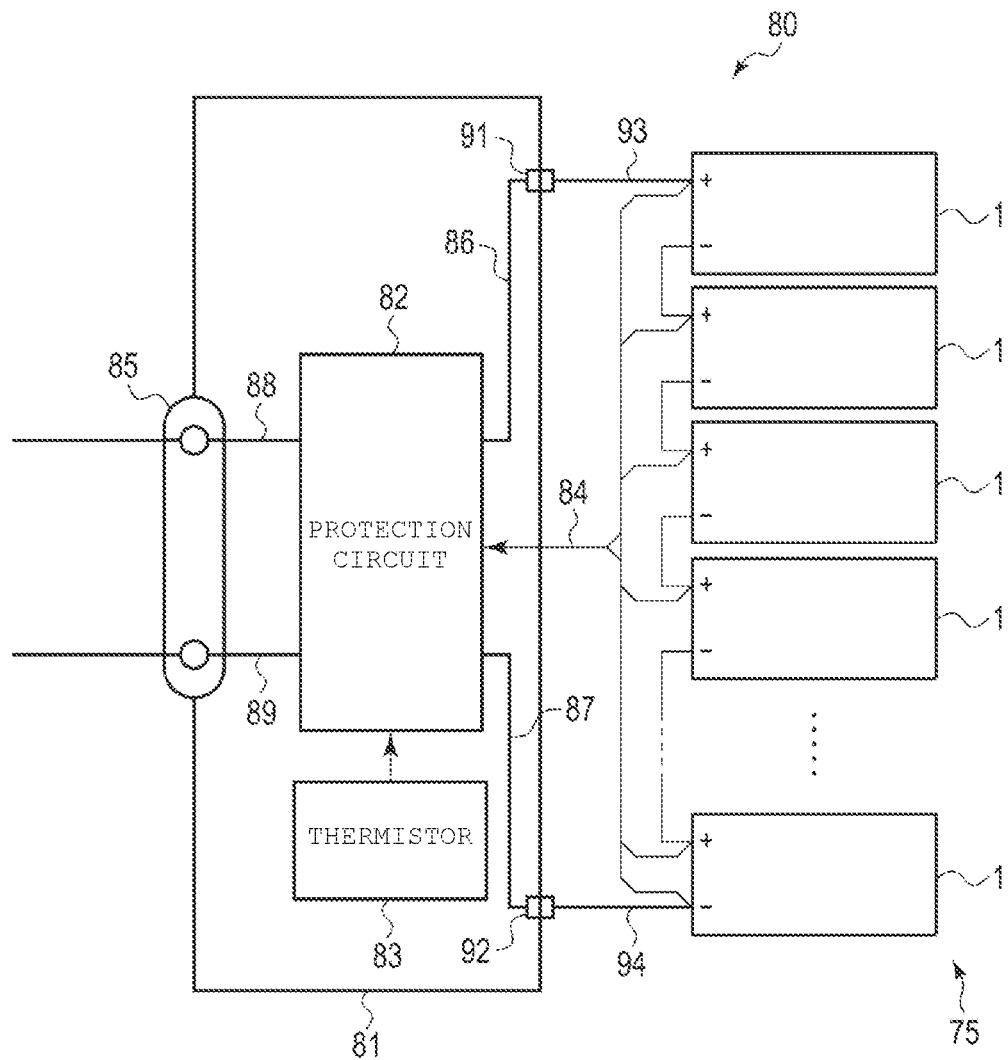
FIG. 15 is a schematic diagram showing an example of a battery pack using the battery according to the embodiment.

A battery pack using the battery according to the preceding embodiment and the like will next be described. FIG. 15 shows an example of a battery pack 80 using the battery 1 according to the embodiment of FIGS. 1 to 14 and the like. In the example of FIG. 15 and the like, a battery module 75 is formed from a plurality of batteries 1. In addition, in the battery module 75, the plurality of batteries 1 are electrically connected in series. The batteries 1 are electrically connected to one another via a bus bar (not shown). A plurality of batteries 1 may be electrically connected in parallel in the battery module 75 in one example. Furthermore, in another example, both a series-connection in which the batteries 1 are connected in series and a parallel-connection in which the batteries 1 are connected in parallel may be formed in the battery module 75.

Moreover, in the battery module 75 of the battery pack 80, one positive-electrode terminal, e.g., 27A corresponding to the plurality of batteries 1, is connected to a positive-electrode-side module terminal 91 via a positive-electrode-side lead 93 and the like. In another corresponding battery 1 different from the batteries 1 to which the positive-electrode-side lead 93 is connected among the plurality of batteries 1, the negative-electrode terminal, e.g., 27B is connected to a negative-electrode-side module terminal 92 via a negative-electrode-side lead 94.

A printed circuit board 81 is provided in the battery pack 80. A protection circuit 82, a thermistor 83 that is a temperature sensor, and a current-carrying external terminal 85 are mounted on the printed circuit board 81. In the battery pack 80, an insulating member, not shown, prevents unnecessary connections between electrical pathways on the printed circuit board 81 and interconnections of the battery module 75. The positive-electrode-side module terminal 91 is connected to the protection circuit 82 via an interconnection 86 and the like formed on the printed circuit board 81, while the negative-electrode-side module terminal 92 is connected to the protection circuit 82 via an interconnection 87 and the like formed on the printed circuit board 81.

The thermistor 83 that is the temperature sensor detects a temperature of each of the plurality of batteries 1 forming the battery module 75. The thermistor 83 then outputs a detection signal about the temperature to the protection circuit 82.

The battery pack 80 has a current detection function and a voltage detection function. In the battery pack 80, an input current to the battery module 75 and an output current from the battery module 75 may be detected, and a current passed through any of the plurality of batteries 1 forming the battery module 75 may be detected. Furthermore, in the battery pack 80, a voltage of each of the batteries 1 may be detected in the battery module 75 and a voltage applied to the entire battery module 75 may be detected. In the battery pack 80, the battery module 75 is connected to the protection circuit 82 via an interconnection 84. A detection signal about a current and a detection signal about a voltage are output to the protection circuit 82 via the interconnection 84.

In one example, a positive-electrode potential or a negative-electrode potential is detected for each of the batteries 1 forming the battery module 75 as an alternative to detection of the voltage of each of the batteries 1. In this case, a lithium electrode or the like is provided in the battery module 75 as a reference electrode. The positive-electrode potential or the negative-electrode potential of each of the batteries 1 is then detected with reference to a potential of the reference electrode.

The external terminal 85 is connected to an apparatus outside of the battery pack 80. The external terminal 85 is used to output the current from the battery module 75 to an outside and/or input the current to the battery module 75. At a time of using the battery module 75 of the battery pack 80 as a power supply, a current is supplied to the outside of the battery pack 80 through the current-carrying external terminal 85. Furthermore, at a time of charging the battery module 75, a charging current is supplied to the battery module 75 through the current-carrying external terminal 85. Examples of the charging current for the battery module 75 include regenerative energy of power of a vehicle or the like. Moreover, the protection circuit 82 can be connected to the external terminal 85 via a plus interconnection 88 and a minus interconnection 89.

The protection circuit 82 has a function to be capable of interrupting an electrical connection between the battery module 75 and the external terminal 85. A relay, a fuse, or the like is provided in the protection circuit 82 as a connection interruption portion. The protection circuit 82 also has a function to control charge-discharge of the battery module 75. The protection circuit 82 controls the charge-discharge of the battery module 75 on the basis of a detection result related to any of the current, the voltage, the temperature, and the like described above.

For example, when a detection temperature of the thermistor 83 is equal to or higher than a predetermined temperature, the protection circuit 82 determines that a predetermined condition is satisfied. Furthermore, when any of overcharge, overdischarge, overcurrent, and the like is detected in the battery module 75, the protection circuit 82 determines that the battery module 75 satisfies a predetermined condition. In addition, when determining that the battery module 75 satisfies the predetermined condition, the protection circuit 82 can interrupt conduction between the protection circuit 82 and the current-carrying external terminal 85. Interrupting the conduction between the protection circuit 82 and the current-carrying external terminal 85 stops outputting the current from the battery module 75 to the outside and inputting the current to the battery module 75. It is thereby possible to effectively prevent continuous occurrence of the overcurrent or the like in the battery module 75.

In one example, a circuit formed in an apparatus using the battery pack 80 (battery module 75) as a power supply may be used as the protection circuit 82. Furthermore, only a single battery 1 may be provided in the battery pack 80 as an alternative to the battery module 75 formed from the plurality of batteries 1. Moreover, in the battery pack 80, a plurality of battery modules 75 may be provided and the battery modules 75 may be electrically connected to one another in series and/or in parallel.

[Uses of Battery Pack]

Configurations and the like of the battery pack 80 having one or more batteries 1 described above are changed as appropriate depending on uses. It is preferable to use the battery pack 80 in an apparatus or the like required to perform high-current charge-discharge. Specific examples of the uses of the battery pack 80 include a power supply of a digital camera, a vehicle-mounted power supply for a vehicle, and a stationary power supply. In this case, examples of the vehicle mounting the battery pack 80 include two-wheeled and four-wheeled hybrid electric vehicles, two-wheeled and four-wheeled electric vehicles, a power-assisted bicycle, a railway vehicle, and a forklift.

Figure 16:
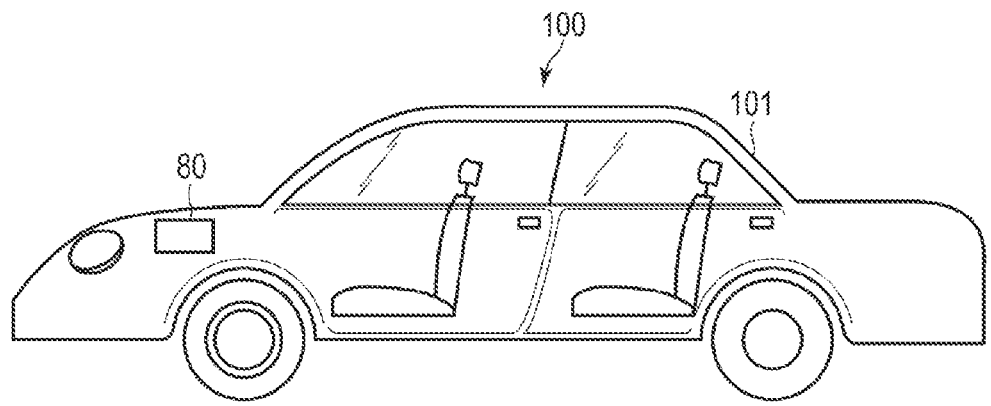
FIG. 16 is a schematic diagram showing an example of application of the battery pack according to the embodiment to a vehicle.

FIG. 16 shows an example of application of the battery pack 80 described above to a vehicle 100 as one example of an application. In the example shown in FIG. 16, the vehicle 100 includes a vehicle main body 101 and the battery pack 80. In the example shown in FIG. 16, the vehicle 100 is a four-wheeled vehicle. The vehicle 100 may mount a plurality of battery packs 80.

In the example of FIG. 16, the battery pack 80 is mounted in an engine room located in a front part of the vehicle main body 101. The battery pack 80 may be mounted, for example, in a rear part of the vehicle main body 101 or under seats. In particular, the battery pack 80 including one or more batteries 1 described above can be disposed even in a narrow space under the seats. As described above, the battery pack 80 can be used as the power supply for the vehicle 100. Furthermore, the battery pack 80 can collect the regenerative energy of the power of the vehicle 100.

In each of the batteries 1 mounted in the vehicle 100 or the like, an external shock on built-in structures accommodated in the internal cavity 11 is reduced. Therefore, it is possible to prevent damage of the built-in structures due to the external shock and improve durability of the built-in structures. Due to this, even when an external shock occurs due to a vibration caused by traveling of the vehicle 100, the influence of the external shock is reduced. This can prevent damage of the built-in structures accommodated in the internal cavity 11 by the external shock.

According to at least one embodiment or example, each of a first protrusion and a second protrusion is connected to an insulation guard and protrudes from the insulation guard. In addition, a protruding end of the first protrusion abuts on a boundary portion between a first side wall and a bottom wall, and a protruding end of the second protrusion abuts on a boundary portion between a second side wall and the bottom wall. It is thereby possible to provide a battery capable of appropriately constraining built-in structures in an internal cavity even when an outer container expands, and ensuring insertability of the built-in structures in the internal cavity at a time of manufacturing.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall in the scope and spirit of the disclosure.

What is claimed is:

1. A battery comprising:
   an outer container including a bottom wall, peripheral walls, and an internal cavity constructed by the bottom wall and the peripheral walls and including an opening to an opposite side to the bottom wall in a height direction, the peripheral walls including a first side wall and a second side wall opposed to each other across the internal cavity in a longitudinal direction crossing the height direction;
   an electrode assembly including a positive electrode and a negative electrode and that is accommodated in the internal cavity of the outer container;
   a lid member attached to the peripheral wall in an end portion on the opposite side to the bottom wall and that blocks the opening of the internal cavity;
   a current collection tab that protrudes from the electrode assembly in a lateral direction crossing both the longitudinal direction and the height direction in the internal cavity;
   an electrode terminal attached to an outer surface of the lid member;
   a lead disposed in the internal cavity and that electrically connects the current collection tab to the electrode terminal;
   an insulation guard formed from a material having electrical insulating properties, and that electrically insulates the lead and the current collection tab from an inner surface of the outer container in the internal cavity;
   a first protrusion connected to the insulation guard and that protrudes from the insulation guard, a protruding end of the first protrusion abutting on a boundary portion between the first side wall and the bottom wall; and
   a second protrusion connected to the insulation guard and that protrudes from the insulation guard, a protruding end of the second protrusion abutting on a boundary portion between the second side wall and the bottom wall, wherein
   the insulation guard includes a guard bottom surface opposed to the bottom wall,
   the first protrusion protrudes from the guard bottom surface toward the boundary portion between the first side wall and the bottom wall, and
   the second protrusion protrudes from the guard bottom surface toward the boundary portion between the second side wall and the bottom wall.

2. The battery according to claim 1, wherein
   each of the first protrusion and the second protrusion protrudes from the insulation guard outward in the longitudinal direction, or protrudes from the insulation guard toward a side on which the bottom wall is located in the height direction.

3. The battery according to claim 1, wherein
   each of the first protrusion and the second protrusion is formed into a plate shape, a width direction of each of the first protrusion and the second protrusion being along the lateral direction of the outer container.

4. The battery according to claim 1, wherein
   each of the first protrusion and the second protrusion is formed from a material having electrical insulating properties.

5. The battery according to claim 1, wherein
   each of the first protrusion and the second protrusion is formed integrally with the insulation guard.

6. The battery according to claim 1, wherein
   a size of the outer container in the longitudinal direction of the internal cavity is smaller than a size of the internal cavity in the lateral direction and a size of the internal cavity in the height direction.

7. The battery according to claim 1, wherein
   the guard bottom surface includes:
   a first inclined surface that forms an edge of a side on which the first side wall is located on the guard bottom surface, and that inclines farther away from the bottom wall in the height direction as being closer to the first side wall in the longitudinal direction; and
   a second inclined surface that forms an edge of a side on which the second side wall is located on the guard bottom surface, and that inclines farther away from the bottom wall in the height direction as being closer to the second side wall in the longitudinal direction,
   the first protrusion protrudes from the first inclined surface toward the boundary portion between the first side wall and the bottom wall, and
   the second protrusion protrudes from the second inclined surface toward the boundary portion between the second side wall and the bottom wall.

8. The battery according to claim 1, wherein
   the peripheral wall of the outer container includes a third side wall that extends continuously along the longitudinal direction between the first side wall and the second side wall, and that is adjacent to the internal cavity from one side in the lateral direction,
   the insulation guard includes:
   a first guard side plate portion that lies between the lead and an inner surface of the first side wall;
   a second guard side plate portion that lies between the lead and an inner surface of the second side wall;
   a third guard side plate portion that lies between the lead and an inner surface of the third side wall; and
   a guard bottom plate portion that lies between the lead and an inner surface of the bottom wall,
   the guard bottom plate portion includes a guard protruding portion that protrudes toward a side on which the electrode assembly is located in the lateral direction with respect to the first guard side plate portion and the second guard side plate portion, and the guard protruding portion is disposed between the electrode assembly and the bottom wall and supports the electrode assembly from a side on which the bottom wall is located in the height direction.

9. The battery according to claim 8, wherein the first protrusion protrudes from the guard protruding portion toward the boundary portion between the first side wall and the bottom wall, and the second protrusion protrudes from the guard protruding portion toward the boundary portion between the second side wall and the bottom wall.

10. The battery according to claim 1, wherein the current collection tab includes: a positive-electrode current collection tab that protrudes from the electrode assembly to one side in the lateral direction; and a negative-electrode current collection tab that protrudes from the electrode assembly toward an opposite side to a side on which the positive-electrode current collection tab protrudes in the lateral direction, the electrode terminal includes a positive-electrode terminal and a negative-electrode terminal, the lead includes: a positive-electrode-side lead that electrically connects the positive-electrode current collection tab to the positive-electrode terminal; and a negative-electrode-side lead that electrically connects the negative-electrode current collection tab to the negative-electrode terminal, the insulation guard includes: a positive-electrode-side insulation guard that electrically insulates the positive-electrode-side lead and the positive-electrode current collection tab from the inner surface of the outer container; and a negative-electrode-side insulation guard that electrically insulates the negative-electrode-side lead and the negative-electrode current collection tab from the inner surface of the outer container, the first protrusion protrudes only from one of the positive-electrode-side insulation guard and the negative-electrode-side insulation guard, or protrudes by one or more first protrusions from each of the positive-electrode-side insulation guard and the negative-electrode-side insulation guard, and the second protrusion protrudes only from one of the positive-electrode-side insulation guard and the negative-electrode-side insulation guard, or protrudes by one or more second protrusions from each of the positive-electrode-side insulation guard and the negative-electrode-side insulation guard.

11. A battery pack comprising one or more batteries according to claim 1.

12. A vehicle comprising a battery pack according to claim 11.

13. A battery comprising:

an outer container including a bottom wall, peripheral walls, and an internal cavity constructed by the bottom wall and the peripheral walls and including an opening to an opposite side to the bottom wall in a height direction, the peripheral walls including a first side wall and a second side wall opposed to each other across the internal cavity in a longitudinal direction crossing the height direction;

an electrode assembly including a positive electrode and a negative electrode and that is accommodated in the internal cavity of the outer container;

a current collection tab that protrudes from the electrode assembly in a lateral direction crossing both the longitudinal direction and the height direction in the internal cavity;

a lead disposed in the internal cavity and that electrically connects the current collection tab to an electrode terminal;

an insulation guard that electrically insulates the lead and the current collection tab from an inner surface of the outer container in the internal cavity;

a first protrusion connected to the insulation guard and that protrudes from the insulation guard, a protruding end of the first protrusion abutting on a boundary portion between the first side wall and the bottom wall; and a second protrusion connected to the insulation guard and that protrudes from the insulation guard, a protruding end of the second protrusion abutting on a boundary portion between the second side wall and the bottom wall, wherein the insulation guard includes a guard bottom surface opposed to the bottom wall, the first protrusion protrudes from the guard bottom surface toward the boundary portion between the first side wall and the bottom wall, and the second protrusion protrudes from the guard bottom surface toward the boundary portion between the second side wall and the bottom wall.

14. The battery according to claim 13, wherein each of the first protrusion and the second protrusion protrudes from the insulation guard outward in the longitudinal direction, or protrudes from the insulation guard toward a side on which the bottom wall is located in the height direction.

15. The battery according to claim 13, wherein each of the first protrusion and the second protrusion is formed into a plate shape, a width direction of each of the first protrusion and the second protrusion being along the lateral direction of the outer container.

16. The battery according to claim 13, wherein the guard bottom surface includes:

a first inclined surface that forms an edge of a side on which the first side wall is located on the guard bottom surface, and that inclines farther away from the bottom wall in the height direction as being closer to the first side wall in the longitudinal direction; and a second inclined surface that forms an edge of a side on which the second side wall is located on the guard bottom surface, and that inclines farther away from the bottom wall in the height direction as being closer to the second side wall in the longitudinal direction, the first protrusion protrudes from the first inclined surface toward the boundary portion between the first side wall and the bottom wall, and the second protrusion protrudes from the second inclined surface toward the boundary portion between the second side wall and the bottom wall.

17. The battery according to claim 13, wherein the peripheral wall of the outer container includes a third side wall that extends continuously along the longitudinal direction between the first side wall and the second side wall, and that is adjacent to the internal cavity from one side in the lateral direction, the insulation guard includes:

a first guard side plate portion that lies between the lead and an inner surface of the first side wall;

a second guard side plate portion that lies between the lead and an inner surface of the second side wall;

a third guard side plate portion that lies between the lead and an inner surface of the third side wall; and a guard bottom plate portion that lies between the lead and an inner surface of the bottom wall, the guard bottom plate portion includes a guard protruding portion that protrudes toward a side on which the electrode assembly is located in the lateral direction with respect to the first guard side plate portion and the second guard side plate portion, and the guard protruding portion is disposed between the electrode assembly and the bottom wall and supports the electrode assembly from a side on which the bottom wall is located in the height direction.

18. The battery according to claim 17, wherein the first protrusion protrudes from the guard protruding portion toward the boundary portion between the first side wall and the bottom wall, and the second protrusion protrudes from the guard protruding portion toward the boundary portion between the second side wall and the bottom wall.

19. The battery according to claim 13, wherein the current collection tab includes: a positive-electrode current collection tab that protrudes from the electrode assembly to one side in the lateral direction; and a negative-electrode current collection tab that protrudes from the electrode assembly toward an opposite side to a side on which the positive-electrode current collection tab protrudes in the lateral direction, the electrode terminal includes a positive-electrode terminal and a negative-electrode terminal, the lead includes: a positive-electrode-side lead that electrically connects the positive-electrode current collection tab to the positive-electrode terminal; and a negative-electrode-side lead that electrically connects the negative-electrode current collection tab to the negative-electrode terminal, the insulation guard includes: a positive-electrode-side insulation guard that electrically insulates the positive-electrode-side lead and the positive-electrode current collection tab from the inner surface of the outer container; and a negative-electrode-side insulation guard that electrically insulates the negative-electrode-side lead and the negative-electrode current collection tab from the inner surface of the outer container, the first protrusion protrudes only from one of the positive-electrode-side insulation guard and the negative-electrode-side insulation guard, or protrudes by one or more first protrusions from each of the positive-electrode-side insulation guard and the negative-electrode-side insulation guard, and the second protrusion protrudes only from one of the positive-electrode-side insulation guard and the negative-electrode-side insulation guard, or protrudes by one or more second protrusions from each of the positive-electrode-side insulation guard and the negative-electrode-side insulation guard.

20. A battery pack comprising one or more batteries according to claim 13.

* * * * *